(12) United States Patent
Cartagena et al.

(10) Patent No.: US 12,143,475 B2
(45) Date of Patent: *Nov. 12, 2024

(54) ENABLING USING EXTERNAL TENANT MASTER KEYS

(71) Applicant: Workday, Inc., Pleasanton, CA (US)

(72) Inventors: Miguel Leonardo Chinchilla Cartagena, Livermore, CA (US); Karina Si-Woon Chan, Oakland, CA (US); Aswani Kaushik Chimthapalli, Fremont, CA (US); Michael Clarke, Dublin (IE); Amol Anant Deshmukh, Dublin, CA (US); Subha Gopalakrishnan, San Ramon, CA (US); Bjorn Brook Hamel, Dublin, CA (US); Louis James LaTouche, Danville, CA (US); Atlee Glen Lyden, Lafayette, CO (US); Marcus Anthony Sanchez, Everett, WA (US); Jasmine Teresa Schladen, Dublin, CA (US); Devaki Ajinkya Tarkunde, Mountain View, CA (US); Harrison Yu, Dublin, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,137

(22) Filed: Sep. 5, 2023

(65) Prior Publication Data
US 2023/0412368 A1    Dec. 21, 2023

Related U.S. Application Data

(63) Continuation of application No. 17/486,457, filed on Sep. 27, 2021, now Pat. No. 11,799,633.

(51) Int. Cl.
H04L 9/08     (2006.01)
H04L 9/14     (2006.01)
H04L 67/561   (2022.01)

(52) U.S. Cl.
CPC .......... *H04L 9/0825* (2013.01); *H04L 9/0822* (2013.01); *H04L 9/14* (2013.01); *H04L 67/561* (2022.05)

(58) Field of Classification Search
CPC ....... H04L 9/0825; H04L 9/0822; H04L 9/14; H04L 67/561
See application file for complete search history.

(56) References Cited

U.S. PATENT DOCUMENTS 8,291,490 B1 * 10/2012 Ahmed ................. G06F 21/604
                                                    726/20
8,321,921 B1 * 11/2012 Ahmed ................. G06F 21/602
                                                    726/5

(Continued)

FOREIGN PATENT DOCUMENTS

CA    2766731    8/2012
CA    2949020    9/2018

(Continued)

OTHER PUBLICATIONS

Ramaswamy Chandramouli, "Cryptographic Key Management Issues and Challenges in Cloud Services", Secure Cloud Computing, NISTIR 7956, Sep. 2013, 36 pages (Year: 2013).*

*Primary Examiner* — Shahriar Zarrineh
(74) *Attorney, Agent, or Firm* — Van Pelt, Yi & James LLP

(57) ABSTRACT

The present application discloses a method, system, and computer system for managing data using keys. The method includes receiving a request to access data, wherein the data is encrypted based on a tenant service encryption key (TSEK) corresponding to the tenant database, determining a (Continued)

wrapper key used in connection with encrypting the TSEK based on a TSEK metadata, determining a top-level key used in connection with encrypting the wrapper key based on wrapper key metadata stored in association with the encrypted version of the wrapper key, obtaining the data stored within the tenant database, comprising decrypting at least part of the data based on (i) the TSEK, (ii) the wrapper key, and (iii) the top-level key, and providing the data in response to the request. The TSEK metadata is stored in the tenant database. An encrypted version of the wrapper key is stored in a key management service.

19 Claims, 9 Drawing Sheets

(56) References Cited

U.S. PATENT DOCUMENTS

| | | | |
|---|---|---|---|
| 9,432,342 B1 | 8/2016 | Kothari | |
| 9,608,810 B1 | 3/2017 | Ghetti | |
| 9,779,269 B1 | 10/2017 | Perlman | |
| 10,013,364 B1 | 7/2018 | Walter | |
| 10,326,744 B1 | 6/2019 | Nossik | |
| 11,349,671 B2 | 5/2022 | Thambundit | |
| 2012/0140923 A1* | 6/2012 | Lee | H04L 9/0894 380/44 |
| 2012/0328105 A1 | 12/2012 | Mukkara | |
| 2015/0319160 A1 | 11/2015 | Ferguson | |
| 2016/0323250 A1 | 11/2016 | Winter | |
| 2017/0244693 A1 | 8/2017 | Papadopoulos | |
| 2018/0060596 A1* | 3/2018 | Hamel | H04L 9/088 |
| 2018/0060600 A1* | 3/2018 | Hamel | H04L 9/0891 |
| 2018/0062835 A1 | 3/2018 | Hamel | |
| 2018/0176017 A1 | 6/2018 | Rodriguez | |
| 2018/0351928 A1 | 12/2018 | Yoo | |
| 2019/0044927 A1* | 2/2019 | Sood | H04L 63/083 |
| 2019/0097791 A1 | 3/2019 | Hersans | |
| 2019/0114438 A1 | 4/2019 | Hersans | |
| 2019/0132299 A1 | 5/2019 | Tucker | |
| 2019/0173674 A1 | 6/2019 | Agarwal | |
| 2019/0253244 A1* | 8/2019 | Hamel | H04L 9/14 |
| 2019/0268148 A1 | 8/2019 | Sun | |
| 2019/0394024 A1 | 12/2019 | Vepa | |
| 2020/0053065 A1 | 2/2020 | Wisniewski | |
| 2021/0120077 A1 | 4/2021 | Guim Bernat | |
| 2021/0143991 A1* | 5/2021 | Toal | H04L 9/0861 |
| 2021/0173945 A1 | 6/2021 | Karr | |
| 2022/0229928 A1 | 7/2022 | Shachar | |
| 2022/0329413 A1 | 10/2022 | Schindewolf | |
| 2022/0385464 A1 | 12/2022 | Anand | |

FOREIGN PATENT DOCUMENTS

| | | | |
|---|---|---|---|
| CN | 106209353 | | 12/2016 |
| CN | 111917725 A | * | 11/2020 |

* cited by examiner

500

510

| ID | Version | Profile_Name | UUID | Key_validation_ciphertext | Creation_time |
|---|---|---|---|---|---|
| 1 | 0 | BTWK | 05b1437c-286d-49b4-bb31-de0e80221d17 | XXXX | 1617770452 |
| 2 | 0 | TKEK | ebfb385f-cd3b-4b98-a4b1-91ae3712c60a2 | XXXX | 1617770452 |
| 3 | 0 | TSEK | 8b9ce46c-9009-4ed3-9da7-18eeb222652fd | XXXX | 1617770452 |
| ... | ... | ... | ... | ... | ... |

520

| ID | Event type | Key metadata ID | Key Management ID | Timestamp |
|---|---|---|---|---|
| 1 | Generated | 1 | 1 | 1617770452 |
| 2 | Active | 1 | 1 | 1617770452 |
| 3 | Disabled | 4 | 6 | 1928602356 |
| 4 | Revoked | 5 | 7 | 2065956507 |
| 5 | Destroyed | 3 | 4 | 2076533591 |
| ... | ... | ... | ... | ... |

530

| ID | Wrapper UUID | Key metadata ID | Encryption Date | Ciphertext |
|---|---|---|---|---|
| 1 | CWK UUID | 4 | 1928602356 | XXXX |
| 2 | Ebfb34092dadfl-3d | 5 | 2065956507 | XXXX |
| ... | ... | ... | ... | ... |

540

| ID | Key metadata ID | 3rd Party Key ARN | 3rd Party Key Region |
|---|---|---|---|
| 1 | 1 | XXXX | US-West |
| ... | ... | ... | ... |

FIG. 5

ENABLING USING EXTERNAL TENANT MASTER KEYS

CROSS REFERENCE TO OTHER APPLICATIONS

This application is a continuation of U.S. patent application Ser. No. 17/486,457 entitled ENABLING USING EXTERNAL TENANT MASTER KEYS filed Sep. 27, 2021 which is incorporated herein by reference for all purposes.

BACKGROUND OF THE INVENTION

A system for big data processing comprises a system for deployments of applications, configurations, one or more datasets, and model(s) used in connection with analyzing the data (e.g., collectively, a shard). The one or more datasets are accessed by users associated with an organization. For example, users may input queries to a client terminal, and the queries are performed by the system for data processing. The one or more datasets are encrypted using keys that are established by the service provider on behalf of the organization. This creates a problem for organizations that want control over their own data and restricting access to keys used in encrypting such data.

BRIEF DESCRIPTION OF THE DRAWINGS

Various embodiments of the invention are disclosed in the following detailed description and the accompanying drawings.

FIG. 5 is a diagram of a key metadata according to various embodiments of the present application.

DETAILED DESCRIPTION

Figure 1:
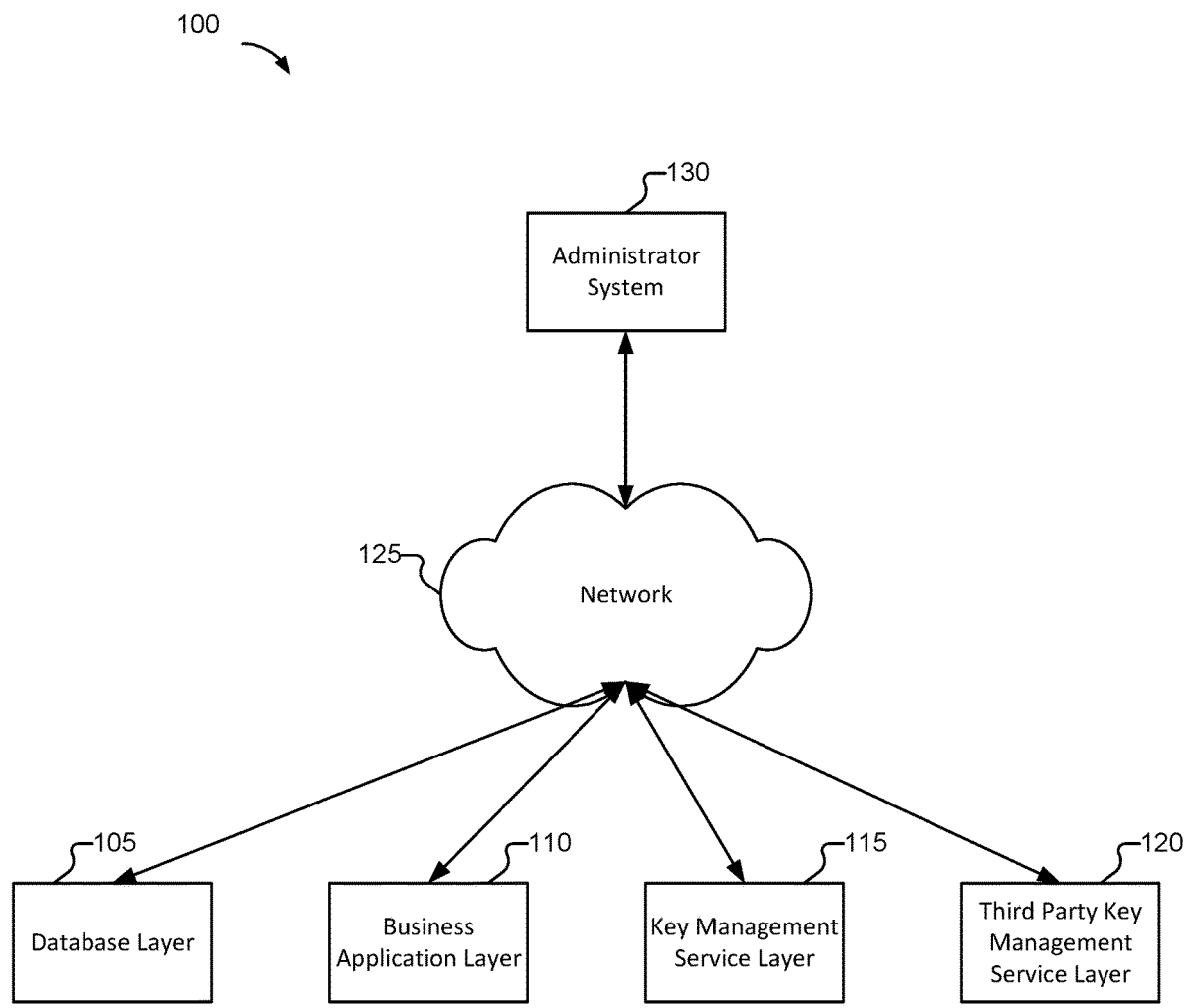
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, an entity is an organization such as a client or customer of a service provider that hosts a service for which the tenant is instantiated. An entity may be a company, a department unit, an association, an institution, an agency, etc.

As used herein, a tenant may be a system including a tenant database associated with an entity, such as a database for data pertaining to a service provided to an entity. An entity may have one or more tenants associated therewith.

As used herein, a TSEK refers to a tenant service encryption key. As used herein, a TKEK refers to a tenant key encryption key. As used herein, a CWK refers to a Customer Wrapper Key (which may also be referred to herein as a wrapper key).

As used herein, a CKEK refers to a Customer Key Encryption Key. The CKEK may be associated with the entity corresponding to the applicable tenant, and the CKEK may be provided by a service provider (e.g., the service provider associated with the service for which the tenant database is managed for/on behalf of the entity).

As used herein, BTWK refers to a bring your own key (BYOK) Tenant Wrapper Key. The BTWK may be provided by the entity associated with the corresponding tenant (e.g., a customer of a service provider). BTWK is not encrypted or stored inside a tenant DB. It is stored inside a hardware security module (HSM) and the identifier associated with the BTWK is stored inside the tenant DB.

As used herein, a BCKEK refers to a BYOK Customer Key Encryption Key. The BCKEK may be provided by the entity associated with the corresponding tenant (e.g., a customer of a service provider).

As used herein, KMS refers to Key Management Service that is provided by a service provider (e.g., the service provider that provides a service for the entity and manages/stores a tenant database in association with the service).

As used herein, a key is a digital key used to decrypt information stored information stored in a database, another key, or an envelope of one or more keys. For example, a key may be used in connection with Transparent Data Encryption of information stored in a tenant database.

A system and method for encrypting keys and/or managing data and access to data is disclosed. The system comprises one or more processors and a memory. The one or more processors are configured to receive a request to access data stored within a tenant database associated with a tenant, determine a wrapper key used in connection with encrypting a TSEK based at least in part on a TSEK metadata stored in association with the TSEK, determine a top-level key used in connection with encrypting the wrapper key based at least in part on wrapper key metadata stored in association with the encrypted version of the wrapper key, obtain the data stored within the tenant database, comprising decrypting at least part of the data based at least in part on (i) the TSEK, (ii) the wrapper key, and (iii) the top-level key, and provide the data in response to the request. The data is encrypted based at least in part on the TSEK corresponding to the tenant database. The TSEK metadata is stored in the tenant database. An encrypted version of the wrapper key is stored in a KMS that is in communication with the tenant database.

According to various embodiments, a system and/or method encrypting keys and/or managing data and access to data is disclosed. The data may be stored in a dataset in a database. As an example, the data is stored in an encrypted state (e.g., one or more keys are used to encrypt the data). In various embodiments, the system and/or method is extensible to enable an entity (e.g., a customer of a service provider providing a service for which a dataset is stored/managed) to provide a top-level key to be used in connection with encrypting one or more keys used to encrypt/decrypt a dataset. As an example, the system and method uses a bring-your-own-key model for managing data for an entity. For example, the entity directs or provides a configuration for a service to use an entity-controlled top-level key in connection with encrypting data stored in association with the service or encrypting one or more key envelope or keys that encrypt the data. According to various embodiments, the top-level key is stored in one or more third party KMSs. Information pertaining to the top-level key used in connection with encrypting an entity's data may be stored in a tenant database storing data for a tenant of the entity, and/or in a KMS provided by the service provider (e.g., the KMS used by the service provider may connect to one or more third party KMSs to access the applicable top-level key).

According to various embodiments, a system includes a KMS. The KMS may be configured to encrypt or manage encryption of data stored in a tenant database and/or to provide access to a top-level key used to decrypt data stored in the tenant database. The KMS may be configured to interface with one or more third party KMSs such as Amazon Web Services™ (AWS), Microsoft Azure™, and Google Cloud™, etc. As an example, the KMS serves as a gateway layer to interface with the one or more third party KMSs and to access the applicable top-level key(s). In some embodiments, the KMS determines the applicable top-level key to use in connection with encrypting/decrypting data in the tenant database or a key corresponding to the entity (e.g., a wrapper key that is managed by the service provider). As an example, the applicable top-level key to use in connection with encrypting/decrypting data in the tenant database may be determined based at least in part on information pertaining to the entity such as an entity configuration, setting, and/or preferences. As another example, the applicable top-level key to use in connection with encrypting/decrypting data in the tenant database may be determined based at least in part on information pertaining to previous encryptions (e.g., historical information indicating an identifier of the top-level key for a most recent encryption, etc.).

In some related art, a service provider generally uses a single top-level key for encrypting/decrypting information (e.g., data, keys, etc.) for customers of the service provider. The top-level key is provided and/or managed by the service provider. The top-level key is generally stored in one or more third party KMSs, such as in association with an account of the service provider. Accordingly, customers have limited control over their data.

Various embodiments enable selective configuration (e.g., by the entity such as a customer, or the service provider) of the service (or management of data for the service) to use a top-level key that is provided/managed by the service provider or a top-level key that is provided/managed by the entity such as the customer. In the case that the service is configured to use a top-level key that is provided/managed by the entity, the entity provides access to the service provider (e.g., to the KMS) to the top-level key stored in the third party KMS (e.g., a top-level key stored in the third party KMS in association with the entity). As an example, the entity configures its account/service with the third party KMS to provide the service provider (e.g., the KMS), or an account associated with the service provider, with access to the top-level key.

According to various embodiments, the top-level key is stored in one or more third party KMSs. An example of the third party KMS includes a HSM. The HSM is a physical computing device that safeguards and manages digital keys, performs encryption and decryption functions for digital signatures, strong authentication and other cryptographic functions. For example, the HSM has hardware and/or software mechanisms to secure the information stored therein.

According to various embodiments, data stored in a tenant database is encrypted using a TSEK. The tenant database may store information pertaining to a service provided by the service provider, such as information or models created in connection with a software as a service. The tenant database may be a business database system, a human resources database system, a financial database system, a university database system, a medical database system, a manufacturing database system, or any other appropriate system. In some embodiments, the tenant database comprises an object-oriented database system. In connection with encrypting the data in the tenant database, the system stores information pertaining to the encryption. For example, the system stores metadata such as a record in a key metadata table that indicates the key used to encrypt the data. The record may indicate the key used to encrypt the data based at least in part on a universally unique identifier (UUID) corresponding to a particular key (e.g., the TSEK). According to various embodiments, a plurality of tenants is associated with a particular entity. In some embodiments, different keys (e.g., TSEKs) are used in connection with encrypting the different datasets pertaining to the plurality of tenants associated with the particular entity. The TSEK may be a bottom-level key used in connection with encrypting the data in the tenant database.

According to various embodiments, in response to decrypting the TSEK, the TSEK is cached for a period of time, and the TSEK may be used in connection with decrypting applicable data. Caching the TSEK for a particular period of time removes the necessity that the wrapper key and/or top-level key is/are queried to decrypt the data stored in the tenant database for a particular use. The period of time for which the TSEK is cached may be configurable, such as configurable by the entity. In some embodiments, the entity corresponding to the top-level key and/or tenant database may cause the cache to be flushed. In response to causing the cache to be flushed, the TSEK and other keys that are cached (e.g., keys corresponding to the entity or tenants of the entity) are deleted/flushed from the cache. As an example, the entity may cause the cache storing keys to be flushed (e.g., by providing an instruction to flush the data such as via selection of a corresponding button element on a user interface) in response to a determination to limit/eliminate access to the underlying data (e.g., the data encrypted using the cached keys). Providing the entity with ability to cause the cache to be flushed provides the entity (e.g., the customer) with a more direct level of security over the data corresponding to the entity.

According to various embodiments, the TSEK is encrypted using at least one other key. A key used to encrypt the TSEK may be associated with the entity or a tenant corresponding to the entity for which the data is encrypted. In some embodiments, the TSEK is encrypted using the TKEK. As an example, the TKEK is stored in the tenant database. Metadata pertaining to the encryption of the TSEK using the TKEK may be stored in connection with the encryption of the TSEK. For example, a record of the encryption of the TSEK with the TKEK may be stored in a table in which key metadata is stored (e.g., a table storing key data, a table storing data pertaining to a key envelope, etc. According to various embodiments, a particular TKEK may be used to encrypt one or more TSEKs (e.g., the TSEKs may be respectively used to encrypt different data in the tenant database). For example, a particular TKEK may be used to encrypt a plurality of TSEKs, such as a number of TSEKs on the order of hundred(s) of TSEKs. According to various embodiments, the TKEK serves as a general tenant key in order to reduce the number of times the wrapper key and/or top-level key is to be queried.

According to various embodiments, in response to decrypting the TKEK, the TKEK is cached for a period of time, and the TKEK may be used in connection with decrypting applicable TSEKs (e.g., TSEKs that were encrypted using the TKEK). Caching the TKEK for a particular period of time removes the necessity that the wrapper key and/or top-level key is/are queried to decrypt the TKEK for a particular use. The period of time for which the TKEK is cached may be configurable, such as configurable by the entity. In some embodiments, the entity corresponding to the top-level key and/or tenant database may cause the cache to be flushed. In response to causing the cache to be flushed, the TKEK and other keys that are cached (e.g., keys corresponding to the entity or tenants of the entity) are deleted/flushed from the cache. As an example, the entity may cause the cache storing keys to be flushed (e.g., by providing an instruction to flush the data such as via selection of a corresponding button element on a user interface) in response to a determination to limit/eliminate access to the underlying data (e.g., the data encrypted using the cached keys). Providing the entity with ability to cause the cache to be flushed provides the entity (e.g., the customer) with a more direct level of security over the data corresponding to the entity.

According to various embodiments, the TSEK is encrypted at least using a wrapper key such as the CWK. The wrapper key may be stored at the KMS. As an example, in the case that a TKEK is implemented to encrypt the TSEK, the wrapper key is used to encrypt the TKEK. A mapping of the wrapper key to the TSEK and/or TKEK may be stored. As an example, key metadata information pertaining to the encrypting of the TSEK and/or TKEK using the wrapper key may be stored in the tenant database. As another example, information pertaining to the key envelope corresponding to the TSEK and/or TKEK wrapped using the wrapper key may be stored in a key metadata table on the tenant database. The metadata information pertaining to the encrypting of the TSEK and/or TKEK using the wrapper key, or the information pertaining to the key envelope, may include an indication of an identifier of the wrapper key (e.g., a universally unique ID for the wrapper key) and/or an indication of the TSEK and/or TKEK that is encrypted. In response to determining that the TSEK and/or the TKEK is to be accessed, the wrapper key used to wrap the TSEK and/or the TKEK may be determined based at least in part on the metadata associated with the TSEK and/or TKEK. In some embodiments, the wrapper key mediates access to the top-level key. For example, the wrapper key may point to multiple top-level keys (e.g., the wrapper key may be variously encrypted by different top-level keys).

According to various embodiments, a top-level key is stored/managed by one or more third party KMSs. As an example, the top-level key is stored in an HSM of the third party KMS. In some implementations, the top-level key may be a key that is provided/managed by the service provider (e.g., the CKEK). The CKEK may be stored in the third party KMS in association with an account for the service provider. In some implementations, the top-level key may be a key that is provided/managed by the entity (e.g., the customer associated with the tenant database) such as the BCKEK. The BCKEK may be stored in the third party KMS in association with an account for the entity. In some embodiments, the particular top-level key used in connection with encrypting data in the tenant database (e.g., encrypting the wrapper key used in connection with encrypting key envelope or a key to encrypt such data) is configurable by the entity (e.g., an administrator of the entity). As an example, the system provides an interface via which the entity may enable and/or disable use of a top-level key that is provided/managed by the entity. In response to a determination that the use of a top-level key that is provided/managed by the entity (e.g., the BCKEK) is enabled, the KMS uses the top-level key that is provided/managed by the entity. Conversely, in response to a determination that the use of a top-level key that is provided/managed by the entity (e.g., the BCKEK) is disabled, the KMS uses the top-level key that is provided/managed by the service provider (e.g., the CKEK). According to various embodiments, the applicable top-level key (e.g., the BCKEK or CKEK, etc.) is used to encrypt the wrapper key (e.g., the CWK).

According to various embodiments, in response to determining that a top-level key is to be used to encrypt/decrypt a wrapper key or key envelope, the KMS determines the applicable top-level key (e.g., a UUID corresponding to the top-level key such as the CKEK or the BCKEK), and communicates a request to the third party KMS for the third party KMS to encrypt/decrypt a wrapper key or key envelope. As an example, the KMS sends the wrapper key and/or key envelope (e.g., the ciphertext for the wrapper key) to the third party management service for the third party management service to encrypt/decrypt. The request communicated to the third party KMS may include an indication of the top-level key to be used (e.g., an identifier such as a UUID of the top-level key) and/or an account of the third party key management service with which the top-level key is associated (e.g., in the case of a CKEK, an indication that the CKEK is stored in association with the account for the service provider; in the case of a BCKEK, an indication that the BCKEK is stored in association with the account for the customer; etc.). In some embodiments, in response to the third party management service encrypting/decrypting the wrapper key and/or a key envelope using the applicable top-level key, the third party management service provides an encrypted version of the wrapper key and/or a key envelope to the KMS.

According to various embodiments, obtaining data from the tenant database comprises determining the applicable keys used in connection with encrypting the data and/or a key envelope pertaining to such encryption, iteratively decrypting the key envelope and/or data using the identified applicable keys. The obtaining the data from the tenant database may further include spinning up a service in a manner that the data may be queried. In some embodiments, the determining the applicable keys used in connection with encrypting the data and/or a key envelope pertaining to such encryption includes querying a key metadata table (e.g., performing a lookup with respect to key metadata table) for an indication of a key envelope for a key that is used to encrypt the data, and to obtain the envelop from an envelope store. The envelope store may be stored in the tenant database. In some embodiments, the envelope store stores encrypted key material, and audit logs/information. As an example, the determining the applicable keys used in connection with encrypting the data and/or a key envelope pertaining to such encryption includes determining the set of keys in an order from a bottom-level key (e.g., the TSEK) to the applicable top-level key (e.g., the BCKEK or the CKEK).

In some embodiments, the audit information/logs store information that tracks a request for retrieval of one or more keys. For example, the audit information/logs stores information tracking requests to access the BCKEK and/or BTWK. In some embodiments, the audit information/logs track the keys used to decrypt a particular wrapper key (e.g., a wrapper key for an entity). The audit information/logs store information may be stored in the tenant database. With respect to the wrapper key (e.g., the CWK) and the service provider-provided top-level key (e.g., the CKEK), the key metadata may be stored in the KMS. With respect to the key that encrypts the data stored in the tenant database (e.g., service data such as a dataset for a service provided to the entity) such as the TSEK, the key metadata may be stored in the tenant database. In the case that the TSEK is encrypted by another key associated with the tenant such as the TKEK (e.g., stored on the tenant database), the key metadata pertaining to the encryption of the TSEK using the TKEK may be stored in the tenant database.

The system improves data security for data stored in a tenant database such as by providing a customer/entity associated with tenant the ability to set/define a top-level key to be used to be used in connection with encrypting the data in the tenant database. The system further improves data security and a customer's control over its data by enabling the customer to revoke permission for the system (e.g., the service provider) to use/access the top-level key (e.g., if the customer has enabled the feature to use the customer's own managed top-level key). The system further improves data security by enabling a customer to instruct/cause the system to flush a cache of any cached keys used in connection with encrypting the data (e.g., the TSEK, the TKEK, the CWK, etc.).

FIG. 1 is a block a diagram of a network system according to various embodiments of the present application.

In the example illustrated in FIG. 1, system 100 includes database layer 105, business application layer 110, key management service layer 115, third party key management service layer 120, and an administrator system 130. In some embodiments, one or more of database layer 105, business application layer 110, and key management service layer 115 may be integrated (e.g., combined into a layer or single set of server(s)). For example, the business application layer 110 may include key management service layer 115. System 100 further includes one or more networks such as network 125 over which administrator system 130 communicates with one or more of database layer 105, business application layer 110, key management service layer 115, and/or third party key management service layer 120. In various embodiments, network 125 includes one or more of a wired network, and/or a wireless network such as a cellular network, a wireless local area network (WLAN), or any other appropriate network. In some embodiments, database layer 105, business application layer 110, key management service layer 115, and third party key management service layer 120 are respectively implemented by one or more servers. As an example, KMS may be implemented as one or more sets of servers. In the case of KMS implemented as a plurality of sets of servers, the sets of servers may be disposed in different geographical locations, and/or a particular set(s) of servers may provide the service for the KMS to customers or database layers disposed in a particular defined geographic location (e.g., a set of servers associated with the KMS disposed in the US may service customers and/or database layers disposed within North America, a set of servers associated with the KMS disposed in Ireland may service customers and/or database layers disposed within Europe, etc.). System 100 may include various other systems or terminals.

Administrator system 130 comprises an administrator system for use by an administrator. For example, administrator system 130 comprises a system for communication, data access, computation, etc. An administrator uses administrator system 130 to maintain database layer 105. For example, an administrator uses administrator system 130 to start and/or stop services on database layer 105, to reboot database layer 105, to install software on database layer 105, to add, modify, and/or remove data on database layer 105, etc. Administrator system 130 communicates with database layer 105 via a web-interface. For example, administrator system 130 communicates with database layer 105 via a web-browser installed on administrator system 130. As an example, administrator system 130 communicates with database layer 105 via an application running on administrator system 130. As another example, administrator system 130 communicates with database layer 105, business application layer 110, key management service layer 115, and/or third party key management service layer 120 via an application running on administrator system 130. An administrator user uses administrator system 130 to configure and/or access data stored in database layer 105, such as to query or configure a dataset for an associated tenant. An administrator user uses administrator system 130 to enable/disable use of a top-level key provided by the entity (e.g., the customer). For example, the administrator configures system 100 to use a top-level key provided by the service provided (e.g., CKEK) or a top-level key provided by the entity (e.g., BCKEK) in connection with encrypting one or more datasets stored on database layer 105. As an example, administrator user uses administrator system 130 to define or set the particular top-level key to be used in connection with encrypting a dataset for a tenant database or set of databases associated with the tenant or entity. As another example, administrator user uses administrator system 130 to flush a cache one or more keys (e.g., decrypted versions of the keys)

stored at one or more of database layer 105 and/or key management service layer 115.

In various embodiments, an administrator (or other user associated with a tenant or entity with which the tenant is associated such as a customer) uses administrator system 130 to configure a service provided to a tenant. As an example, the administrator uses administrator system 130 to communicate with business application layer 110 to configure the service provided to the tenant. In some embodiments, business application layer 110 serves as a gateway via which the administrator may interface to manage, configure, etc. database layer 105, key management service layer 115, and/or third party key management service layer 120.

The database layer 105 stores one or more datasets. In various embodiments, the one or more datasets comprise human resources data, financial data, organizational planning data, or any other appropriate data. In some embodiments, the database layer 105 stores one or more datasets for a plurality of tenants. For example, the database layer 105 hosts at least part of a software as a service (e.g., a database storing data for the service) for a plurality of tenants such as customers for a provider of the software as a service). In various embodiments, a tenant comprises an organization such as a company, a government entity, a sub-organization of an organization (e.g., a department), or any other appropriate organization. For example, database layer 105 comprises a database system for storing data in a table-based data structure, an object-based data structure, etc. In various embodiments, database layer 105 comprises a business database system, a human resources database system, a financial database system, a university database system, a medical database system, a manufacturing database system, or any other appropriate system. In some embodiments, database layer 105 comprises an object-oriented database system.

According to various embodiments, a user uses system 100 (e.g., a client or terminal that connects to system 100 via network 125) to execute one or more tasks with respect to data (e.g., one or more datasets) stored on database layer 105. For example, a user inputs to a client terminal a query or request to execute a task (e.g., run a query against a dataset) at database layer 105, and database layer 105 receives the query or request to execute the task from client terminal via network 125, etc. In response to receiving the query or request to execute the task, database layer 105 executes the task and provides a result to the user (e.g., via the client terminal). In some embodiments, the result comprises information or a set of information that is responsive to the query or execution of the task. In some embodiments, the result comprises a report including information that is responsive to the query or execution of the task or selectable elements (e.g., links such as hyperlinks) that point to information that is responsive to the query or execution of the task.

According to various embodiments, key management service layer 115 (e.g., KMS) serves as a gateway to a top-level key for use in connection with encrypting/decrypting data stored in a tenant database. In some embodiments, key management service layer 115 mediates the query for, or access to, top-level keys that are used to encrypt/decrypt data stored in the tenant database. For example, key management service layer 115 manages a determination of a top-level key to encrypt/decrypt data stored in the tenant database. As an example, key management service layer 115 determines the top-level key to use to encrypt/decrypt the wrapper key (e.g., the CWK) based at least in part on one or more of an entity associated with a tenant for which the wrapper key is being used, the tenant, a particular dataset associated with the tenant, and/or one or more keys used to encrypt the data such as the TKEK and/or the TSEK. In some embodiments, key management service layer 115 determines the third party KMS from which the applicable top-level key is to be accessed. For example, key management service layer 115 is configured to communicate with one or more third party KMS layers, and the third party KMS layer associated with the entity (e.g., on which the entity has an account and on which the top-level key such as the BCKEK is stored) from which key management service layer 115 determines the third party KMS layer with which to communicate to access/use the top-level key in connection with encrypting/decrypting the data in database layer 105. In the case of the use of a top-level key that is provided/managed by the entity to encrypt/decrypt data, key management service layer 115 determines to communicate with the key management service layer 115 on which the entity has an account storing, or associated with, the top-level key being provided by the entity. In the case of the use of top-level key that is provided/managed by the service provider (e.g., the CKEK), key management service layer 115 communicates with the third party key management service layer 120 on which the service provider has an account (or a default or other predetermined third party key management service layer 120 used by the service provider to provide/manage a top-level key).

An association between one or more keys and data such as a dataset stored in the tenant database is created and stored. As an example, the association between the one or more keys and data may be stored as one or more mapping tables. As an example, a mapping of one or more keys to the data is stored in database layer 105 (e.g., in the tenant database). In some embodiments, storing the association between one or more keys and data includes storing metadata associated with the one or more keys.

According to various embodiments, third party key management service layer 120 stores and/or manages a top-level key. Third party key management service layer 120 is a service provider that is different from the service provider associated with key management service layer 115 and/or the service associated with the tenant database. In some embodiments, the service provider associated with key management service layer 115, database layer 105, and/or business application layer 110 has an account with third party key management service layer 120. For example, third party key management service layer 120 stores a top-level key associated with the service provider (e.g., the CKEK) in association with the account of the service provider at third party key management service layer 120. In some embodiments, an entity (e.g., a customer of the service provider) has an account with third party key management service layer 120. For example, third party key management service layer 120 stores a top-level key associated with the entity (e.g., the BCKEK) in association with the account of the service provider at third party key management service layer 120. According to various embodiments, third party key management service layer 120 provides an entity (e.g., an account holder with third party management service) the ability to selectively share a top-level key associated with the account of the entity with another user or account of the third party key management service layer 120. For example, the entity is able to selectively share (e.g., permit access to) a top-level key of the entity with the service provider. Accordingly, an entity is able to "bring its own key" for the encryption/decryption of data in a tenant database of the entity being managed/stored by another service provider. In some embodiments, sharing a top-level key associated with an account of the third party key management service layer 120 includes permitting (e.g., receiving, processing, and providing a responsive information) a query to the top-level key to encrypt/decrypt information such as a wrapper key or key envelope (e.g., CWK ciphertext). For example, in response to determining a top-level key to use in connection with encrypting/decrypting a wrapper key (e.g., CWK), key management service layer 115 sends the wrapper key and/or associated ciphertext to an HSM in which the top-level key is stored (e.g., a customer's HSM) and the top-level key is used by third party key management service layer 120 to encrypt/decrypt the wrapper key and/or associated ciphertext.

According to various embodiments, business application layer 110 provides an interface via which a user (e.g., using a user system) may interact with database layer 105, key management service layer 115, and/or third party key management service 120. For example, a user queries database layer 105 by sending a query/request to business application layer 110, which interfaces with database layer 105 to obtain information responsive to the query (e.g., business application layer 110 formats the query according to the applicable syntax and send the formatted query to database layer 105). As another example, an administrator uses an interface provided/configured by business application layer 110 to upload information, a model, or update to information/models to database layer 105. As another example, an administrator uses an interface provided/configured by business application layer 110 to define/update top-level key sharing policies (e.g., define permissions to allow for a top-level key to be accessed/queried/used to encrypt/decrypt information such as a wrapper key, etc.), key caching policies (e.g., set an amount of time that a key is to be cached, a frequency or event in response to which the cache is to be flushed, etc.), policies pertaining to one or more datasets stored in the tenant database (e.g., database layer 105).

In some embodiments, database layer 105, business application layer 110, and/or key management service layer 115, and/or third party key management service layer 120 are implemented on a single server or a plurality of servers. For example, database layer 105 and business application layer 110 are different modules running on a same server or set of servers.

Figure 2:
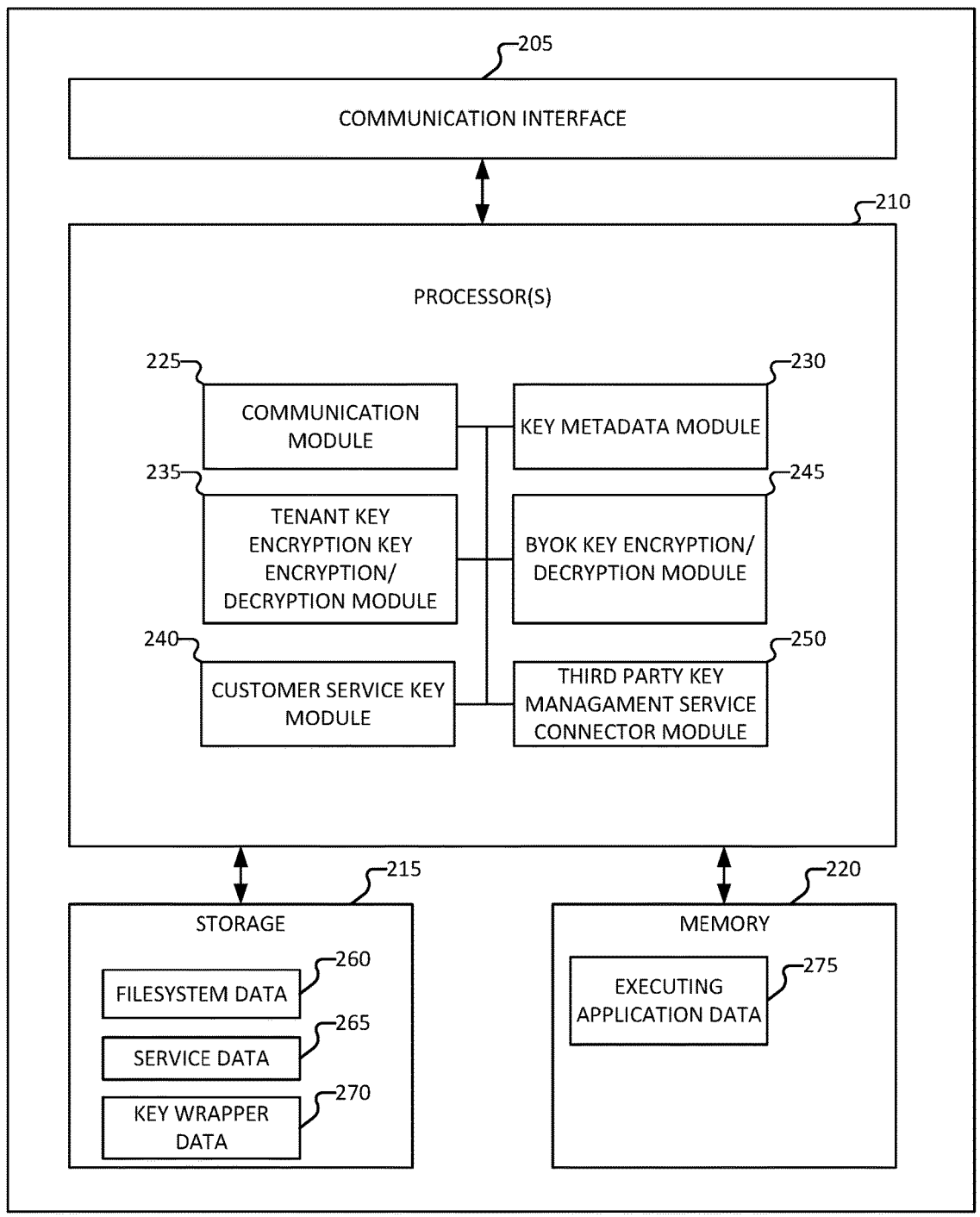
FIG. 2 is a block diagram of a key management service system according to various embodiments of the present application.

FIG. 2 is a block diagram of a key management service system according to various embodiments of the present application. In some embodiments, system 200 comprises, or corresponds to, key management service layer 115, business application layer 110, and/or database layer 105. System 200 may implement at least part of system 100 of FIG. 1, system 400 of FIG. 4 (e.g., tenant database 410 of FIG. 4), encryption information 500 of FIG. 5, process 600 of FIG. 6, process 700 of FIG. 7, process 800 of FIG. 8, and/or process 900 of FIG. 9. According to various embodiments, system 200 corresponds to, or comprises, a KMS. In some embodiments, system 200 (or parts thereof) and system 300 (or parts thereof) are integrated or comprised in a same service layer or device (e.g., a server).

In the example shown, system 200 implements one or more modules in connection with managing one or more datasets, managing encryption/decryption of data (e.g., a dataset) such as data in a tenant database, managing encryption/decryption of one or more keys or key envelopes pertaining to the encryption of the data, encrypting/decrypting the data and/or one or more keys or key envelopes, communicating with one or more third party KMSs (e.g., in connection with accessing/using a top-level key stored in an HSM on the third party management service), etc. System 200 comprises communication interface 205, one or more processors 210, storage 215, and/or memory 220. One or more processors 210 comprises one or more of communication module 225, key metadata module 230, tenant key encryption key (TKEK) encryption/decryption module 235, customer service key module 240, BYOK key encryption/decryption module 245, and/or third party key management service connector module 250.

In some embodiments, system 200 comprises communication module 225. System 200 uses communication module 225 to communicate with various client terminals or user systems such as a user system or an administrator system, or other layers of system 100 such as a third party KMS layer, a tenant database, etc. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems (e.g., from the terminals or systems via a business application layer). The one or more queries or requests to execute tasks is with respect to information stored in one or more datasets. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that user system is caused to display). In some embodiments, communication module 225 is configured to receive information and/or an instruction pertaining to a key (e.g., a top-level key, an instruction to flush a cache of decrypted keys pertaining to a tenant/customer, etc.) such as from various client terminals or user systems. For example, communication module 225 is configured to receive an indication of a top-level key (e.g., a new top-level key, a different top-level key, etc.) to use in connection with encrypting/decrypting information (e.g., information stored on the tenant database, a key such as the wrapper key, etc.). In some embodiments, communication module 225 is configured to send/receive information in connection with encrypting/decrypting information (e.g., information stored on the tenant database, a key such as the wrapper key, etc.). For example, communication module 225 sends a request to a third party management service to encrypt/decrypt a wrapper key (e.g., the request includes, or is associated with, a wrapper key, ciphertext of the wrapper key, etc.). As another example, communication module 225 sends a response for a request to encrypt/decrypt information or a key stored on the tenant database (e.g., a request to encrypt/decrypt the TKEK such as by using the CWK, etc.). As another example, communication module 225 is configured to receive a configuration of a model or dataset stored in a tenant database, a preferences or settings of the tenant database or keys to use in connection with encrypting/decrypting data stored in the tenant database. In some embodiments, communication module 225 is configured to receive information and/or an instruction pertaining to permissions to access/use a top-level key stored in a third party management service (e.g., an HSM of the third party management service), a BYOK tenant wrapper key (e.g., BTWK). For example, a user associated with a customer (e.g., an entity) sends to system 200 an indication that a particular key (e.g., the BTWK, BCKEK, etc.) is to be used for encryption/decryption of data stored in a tenant database, and communication module 225 receives such indication. In some embodiments, communication module 225 communicates with tenant database in connection with encrypting/decrypting information stored on tenant database. For example, communication module 225 receives an indication (e.g., a request) that a key or key envelope (e.g., the TKEK, TSEK, etc.) is to be decrypted using a key stored on system 200 (e.g., CWK).

In some embodiments, system 200 comprises key metadata module 230. According to various embodiments, key metadata module 230 is implemented in database layer 105, business application layer 110, and/or key management service layer 115. System 200 uses key metadata module 230 to store and/or manage metadata associated with one or more keys or encryption metadata pertaining to data from the tenant database that is encrypted. As an example, key metadata module 230 is configured to store a mapping of one or more keys used to encrypt data of the tenant database. Key metadata module 230 stores an indication of a key used to encrypt data (e.g., a TSEK), and/or an indication of one or more keys used to encrypt the key used to encrypt data (e.g., an indication of the TKEK, the CWK, the CKEK, and/or the BCKEK, etc.). As an example, the indication of the key used to encrypt data or another key includes an identifier of the key such as a UUID of the corresponding key(s). In some embodiments, key metadata module 230 stores information (e.g., metadata) pertaining to an encryption/decryption event. For example, each time an item (e.g., data, a key, or key envelope, etc.) is encrypted key metadata module 230 stores information pertaining to the event such as a record or transaction identifier (e.g., an identifier that uniquely identifies the event at least with respect to a tenant database, system 200, and/or system 100, etc.), a time and/or a date that the item was encrypted, an IP address of a terminal or server that encrypted the item, a device identifier of the terminal or server that encrypted the item (e.g., a MAC identifier), an indication of the item that was encrypted (e.g., an identifier corresponding to the data such as an identifier of a dataset, an identifier for a key, an identifier corresponding a key envelope, etc.), an indication of the key used to encrypt item (e.g., one or more of an identifier for the key, a version of the key, etc.), etc. In some embodiments, key metadata module 230 stores the information pertaining to an encryption/decryption event at least partially in the tenant database such as on database service layer 105. For example, key metadata module 230 stores the information/metadata in one or more metadata tables (e.g., a key metadata table such as the example illustrated in FIG. 5). In some implementations, part of key metadata (e.g., metadata pertaining to encryption of one or more keys used in connection with encrypting data on the tenant database) is stored on a tenant database, and part of the key metadata is stored on the KMS. In some implementations, information sufficient to determine each key used in connection with encrypting data and one or more key(s) used to encrypt a key used to encrypt the data (e.g., a key(s) used to encrypt the TSEK, etc.) is stored at the tenant database (e.g., in one or more transaction records of a tenant database). For example, the tenant database stores (i) key metadata (e.g., an indication) of the TSEK used to encrypt a particular set of data, (ii) key metadata of the TKEK used to encrypt the TSEK, (iii) key metadata of the CWK used to encrypt the TSEK or a key envelope pertaining to the encryption of the TSEK using the TKEK, and/or (iv) key metadata of the top-level key used to encrypt the CWK or a key envelope pertaining to the encryption of the TSEK using the TKEK further encrypted by the CWK. As an example, the top-level key is the CKEK or the BCKEK such as based on whether the entity corresponding to the tenant database (e.g., the customer) has enabled a "bring your own key" feature (e.g., if such feature is enabled the top-level key is the BCKEK so selected/identified by the customer). As another example, the tenant database stores an indication of the BTWK used in connection with encrypting (i) the TKEK or a key envelope pertaining to the encryption of the TSEK using the TKEK, or (ii) the CWK or a key envelope pertaining to the encryption of the TSEK using the TKEK further encrypted by the CWK. As an example, BTWK is used based on whether the entity corresponding to the tenant database (e.g., the customer) has enabled a "bring your own key" feature for use in connection with encrypting the TKEK (e.g., if such feature is enabled the BTWK used is the key so selected/identified by the customer).

According to various embodiments, system 200 comprises tenant key encryption key (TKEK) encryption/decryption module 235. System 200 uses TKEK encryption/decryption module 235 to encrypt/decrypt the TKEK. In some embodiments, system 200 determines the key to use to encrypt the TKEK, encrypts the TKEK, and provides metadata (e.g., key metadata) pertaining to the event of encrypting the TKEK to key metadata module 230 to store such metadata. In some embodiments, key metadata module 230 stores an indication of a key used to encrypt data (e.g., a CSEK), and/or an indication of one or more keys used to encrypt the key used to encrypt data (e.g., an indication of the CKEK, the BCKEK, etc.). In some embodiments, system 200 determines the key(s) to encrypt the TKEK (or corresponding key envelope) based at least in part on whether the entity associated with the tenant database (e.g., the customer) has enabled a "bring your own key" feature for use in connection with encrypting the TKEK. For example, in response to determining that the "bring your own key" feature is not enabled for use in connection with encrypting the TKEK, TKEK encryption/decryption module 235 determines to use the applicable CWK (e.g., the CWK corresponding to the entity) to encrypt the TKEK (or corresponding key envelope). As another example, in response to determining that the "bring your own key" feature is enabled for use in connection with encrypting the TKEK, TKEK encryption/decryption module 235 determines to use the applicable CWK and a BYOK tenant wrapper key (BTWK) to encrypt the TKEK (or corresponding key envelope). TKEK encryption/decryption module 235 encrypts/decrypts the TKEK (or corresponding key envelope) based at least in part on the determined key(s) used for encryption/decryption. As an example, in the case that the "bring your own key" feature is enabled for use in connection with encrypting the TKEK, TKEK encryption/decryption module 235 encrypts the TKEK (or corresponding key envelope) using the CWK and the BTWK in series (e.g., the TKEK is encrypted or wrapped using the CWK, and the resulting ciphertext is then encrypted/wrapped using the BTWK). In some embodiments, if TKEK encryption/decryption module 235 determines that a BTWK is to be used in connection with encrypting/decrypting a TKEK, TKEK encryption/decryption module 235 communicates with one or more third party KMSs (e.g., via one or more third party key management services connector module 250 and/or communication module 225) to request that the BTWK be used for such encryption/encryption. For example, the key or corresponding key envelope (e.g., the ciphertext) to be encrypted by the selected BTWK (e.g., the BTWK corresponding to the entity) is sent to the third party management service, the third party key management uses the BTWK to encrypt/decrypt the key or corresponding key envelope (e.g., the ciphertext), and third party KMS returns the result of such encryption/decryption. In some embodiments, in response to determining that a BTWK is to be used in connection with encrypting/decrypting a TKEK, TKEK encryption/decryption module 235 communicates a request/indication to BYOK key encryption/decryption module 245 to perform (or manage/coordinate performance of) the encrypting/decrypting of the TKEK (or corresponding key envelope). For example, the key or corresponding key envelope (e.g., the ciphertext) to be encrypted by the selected BTWK (e.g., the BTWK corresponding to the entity) is sent to the third party management service, the third party key management uses the BTWK to encrypt/decrypt the key or corresponding key envelope (e.g., the ciphertext), and third party KMS returns the result of such encryption/decryption.

In some embodiments, system 200 comprises customer service key module 240. System uses customer service key module 240 in connection encrypting one or more services provided to an entity such as customer. For example, customer service key module 240 determines a customer service encryption key (CSEK) to use in connection with encrypting/decrypting a service, and uses the determined CSEK to encrypt/decrypt the service. In some embodiments, customer service key module 240 determines to encrypt the customer service and/or the CSEK with the CWK. For example, the CWK is used to reduce a number of queries sent to one or more third party KMSs for use of a top-level key in connection with encrypting/decrypting the CSEK.

In some embodiments, system 200 comprises BYOK key encryption/decryption module 245. BYOK key encryption/decryption module 245 provides extensibility for an entity (e.g., a customer of the service provider associated with system 200) to use a top-level key provided/managed by the entity. For example, BYOK key encryption/decryption module 245 provides the entity with control over access of a top-level key for encrypting/decrypting data or services of the entity or a tenant associated with the entity. In some embodiments, system 200 uses BYOK key encryption/decryption module 245 to determine a top-level key to use in connection with encrypting/decrypting data (e.g., data stored on the tenant database) or a key such as a CWK or TKEK. In response to determining that the top-level key to use in connection with the encrypting/decrypting is a key that is provided by the entity, BYOK key encryption/decryption module 245 communicates with the third party KMS (e.g., via one or more third party key management services connector module 250 and/or communication module 225) to request that the corresponding top-level key (e.g., BCKEK) be used for such encryption/encryption. For example, the key or corresponding key envelope (e.g., the ciphertext) to be encrypted by the selected BCKEK (e.g., the BCKEK corresponding to the entity or otherwise selected by the entity) is sent to the third party management service, the third party key management uses the BCKEK to encrypt/decrypt the key or corresponding key envelope (e.g., the ciphertext), and third party KMS returns the result of such encryption/decryption. In some embodiments, an entity (e.g., a user administrator of the entity) communicates an indication to BYOK key encryption/decryption module 245 that a "bring your own key" is enabled or disabled, as applicable, for the entity. For example, the entity uses BYOK key encryption/decryption module 245 to toggle between use of a BYOK key or a service-provider provided key such as the CKEK. As an example, the top-level key is the CKEK or the BCKEK such as based on whether the entity corresponding to the tenant database (e.g., the customer) has enabled a "bring your own key" feature (e.g., if such feature is enabled the top-level key is the BCKEK so selected/identified by the customer). In some embodiments, system 200 stores key metadata of the top-level key used to encrypt the CWK.

In some embodiments, system 200 comprises third party key management service connector module 250. System 200 uses third party key management service connector module 250 to connect to one or more third party KMSs. As an example, one or more third party KMSs stores a top-level key that is used in connection with encrypting/decrypting data or services, or key(s) used to encrypt/decrypt the data or services. In some embodiments, third party key management service connector module 250 is configured to connect to different third party KMSs based on a location of a top-level key. For example, a first entity uses a first third party KMS (e.g., Amazon Web Services™) to store a top-level key in an HSM, and a second entity uses a second third party KMS (e.g., Microsoft Azure™) to store a top-level key in an HSM. Accordingly, third party key management service connector module 250 selectively connects to the first third party KMS or the second third party KMS based on whether the top-level key being used is for the first entity or the second entity. In some implementations, an entity has one or more top-level keys stored across one or more third party KMSs. Third party key management service connector module 250 selectively connects to the one or more third party KMSs to obtain or use the applicable top-level key. For example, third party key management service connector module 250 uses an Application Programming Interface (API) associated with one or more third party KMSs (or other predefined communication protocol/syntax) to communicate with the third party KMS. As an example, third party key management service connector module 250 communicates a key or key envelope (e.g., ciphertext) to the applicable third party KMS in connection with requesting that the third party service use the top-level key to encrypt/decrypt the key or key envelope (e.g., ciphertext). Third party key management service connector module 250 indicates the entity or HSM associated with the, or an identifier of the top-level key to be used to encrypt/decrypt the key or key envelope (e.g., ciphertext). In some embodiments, system 200 uses third party key management service connector module 250 in connection with communicating with the third party KMS to encrypt the TKEK, or corresponding key envelope such as an envelope corresponding to the TKEK encrypted using the CWK.

According to various embodiments, storage 215 comprises one or more of filesystem data 260, service data 265, and/or key wrapper data 270. Storage 215 comprises a shared storage (e.g., a network storage system) and/or database data, and/or user activity data. In some embodiments, filesystem data 260 comprises a database such as one or more datasets (e.g., one or more datasets for one or more tenants, etc.). Filesystem data 260 comprises data such as a dataset for training a machine learning process, historical information pertaining user activity, a human resources database, a financial database, etc.). In some embodiments, service data 265 comprises information pertaining to one or more services provided by system 200 or by an application running in system 100. In some embodiments, key wrapper data 270 comprises information pertaining to key metadata or other information pertaining to an encryption of a key or data such as data stored on the tenant database. As an example, key wrapper data 270 comprises one or more mapping tables of encryption keys to data, or encryption keys to key envelopes.

According to various embodiments, memory 220 comprises executing application data 275. Executing application data 275 comprises data obtained or used in connection with executing an application such as an application executing on a tenant. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
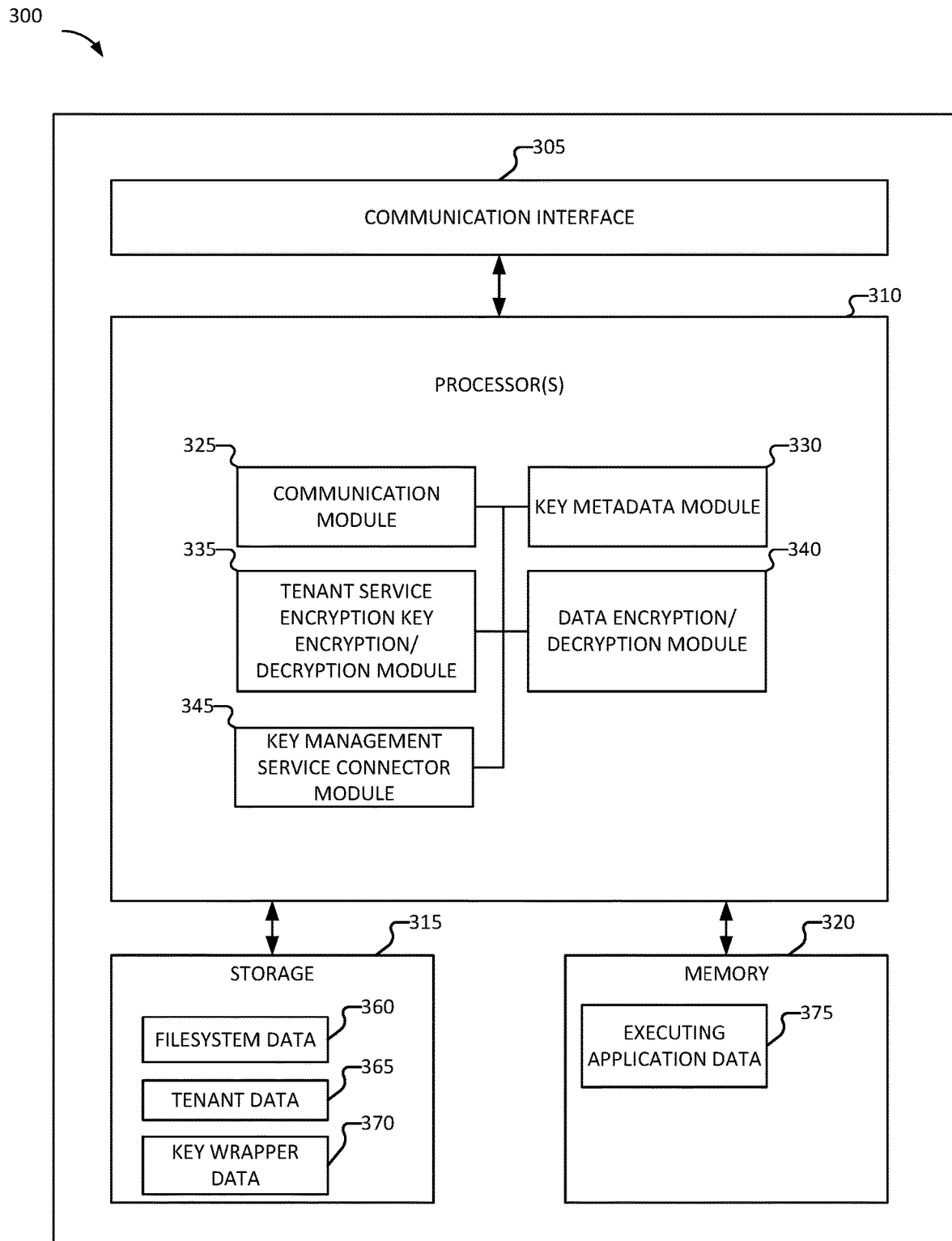
FIG. 3 is a block diagram of a tenant database system according to various embodiments of the present application.

FIG. 3 is a block diagram of a tenant database system according to various embodiments of the present application. In some embodiments, system 300 comprises, or corresponds to, database layer 105, key management service layer 115, and/or business application layer 110. System 300 may implement at least part of system 100 of FIG. 1, system 400 of FIG. 4, encryption information 500 of FIG. 5 (e.g., key management system 420 of Figure, process 600 of FIG. 6, process 700 of FIG. 7, process 800 of FIG. 8, and/or process 900 of FIG. 9. According to various embodiments, system 200 corresponds to, or comprises, a tenant database. In some embodiments, system 200 (or parts thereof) and system 300 (or parts thereof) are integrated or comprised in a same service layer or device (e.g., a server).

In the example shown, system 300 implements one or more modules in connection with managing one or more datasets, managing encryption/decryption of data (e.g., a dataset) such as data in a tenant database, managing encryption/decryption of one or more keys or key envelopes pertaining to the encryption of the data, encrypting/decrypting the data and/or one or more keys or key envelopes, etc. System 300 comprises communication interface 305, one or more processors 310, storage 315, and/or memory 320. One or more processors 310 comprises one or more of communication module 325, key metadata module 330, tenant service encryption key (TSEK) encryption/decryption module 335, data encryption/decryption module 340, and/or key management service connector module 345.

In some embodiments, system 300 comprises communication module 325. System 300 uses communication module 325 to communicate with various client terminals or user systems such as a user system or an administrator system, or other layers of system 100 such as a third party KMS layer, a tenant database, etc. For example, communication module 325 provides to communication interface 305 information that is to be communicated. As another example, communication interface 305 provides to communication module 325 information received by system 300. Communication module 325 is configured to receive one or more queries or requests to execute tasks such as from various client terminals or user systems (e.g., from the terminals or systems via a business application layer). The one or more queries or requests to execute tasks is with respect to information stored in one or more datasets. Communication module 325 is configured to provide to various client terminals or user systems information such as information that is responsive to one or more queries or tasks requested to be executed. In some embodiments, communication module 325 provides the information to the various client terminals or user systems information in the form of one or more reports (e.g., according to a predefined format or to a requested format), and/or via one or more users interfaces (e.g., an interface that user system is caused to display). In some embodiments, communication module 325 is configured to receive information and/or an instruction pertaining to a key (e.g., a top-level key, an instruction to flush a cache of decrypted keys pertaining to a tenant/customer, etc.) such as from various client terminals or user systems. For example, communication module 325 is configured to receive an indication of a top-level key (e.g., a new top-level key, a different top-level key, etc.) to use in connection with encrypting/decrypting information (e.g., information stored on the tenant database, a key such as the wrapper key, etc.). In some embodiments, communication module 325 is configured to send/receive information in connection with encrypting/decrypting information (e.g., information stored on the tenant database, a key such as the wrapper key, etc.). For example, communication module 325 sends a response for a request to encrypt/decrypt information or a key stored on the tenant database (e.g., a request to encrypt/decrypt the TKEK such as by using the CWK, etc.). As another example, communication module 325 is configured to receive a configuration of a model or dataset stored in a tenant database, a preferences or settings of the tenant database or keys to use in connection with encrypting/decrypting data stored in the tenant database. In some embodiments, communication module 325 is configured to receive information and/or an instruction pertaining to permissions to access/use a top-level key stored in a third party management service (e.g., an HSM of the third party management service), a BYOK tenant wrapper key (e.g., BTWK). For example, a user associated with a customer (e.g., an entity) sends to system 200 an indication that a particular key (e.g., the BTWK, BCKEK, etc.) is to be used for encryption/decryption of data stored in a tenant database, and communication module 325 receives such indication. In some embodiments, communication module 325 communicates with tenant database in connection with encrypting/decrypting information stored on tenant database. For example, communication module 325 communicates an indication (e.g., a request) that data stored in the tenant database is to be encrypted/decrypted (e.g., using a TSEK). In some embodiments, communication module 325 communicates with a KMS such as in connection with encrypting/decrypting a TKEK (or corresponding key envelope). For example, communication module 325 communicates with a KMS a request to encrypt/decrypt the TKEK (or corresponding key envelope) using a wrapper key such as a CWK and/or a top-level key such as a CKEK or a BCKEK.

In some embodiments, system 300 comprises key metadata module 330. According to various embodiments, key metadata module 330 is implemented in database layer 105, business application layer 110, and/or key management service layer 115. System 300 uses key metadata module 330 to store and/or manage metadata associated with one or more keys or encryption metadata pertaining to data from the tenant database that is encrypted. As an example, key metadata module 330 is configured to store a mapping of one or more keys used to encrypt data of the tenant database. Key metadata module 330 stores an indication of a key used to encrypt data (e.g., a TSEK), and/or an indication of one or more keys used to encrypt the key used to encrypt data (e.g., an indication of the TKEK, the CWK, etc.). As an example, the indication of the key used to encrypt data or another key includes an identifier of the key such as a UUID of the corresponding key(s). In some embodiments, key metadata module 330 stores information (e.g., metadata) pertaining to an encryption/decryption event. For example, each time an item (e.g., data, a key, or key envelope, etc.) is encrypted key metadata module 330 stores information pertaining to the event such as a record or transaction identifier (e.g., an identifier that uniquely identifies the event at least with respect to a tenant database, system 300, and/or system 100, etc.), a time and/or a date that the item was encrypted, an IP address of a terminal or server that encrypted the item, a device identifier of the terminal or server that encrypted the item (e.g., a MAC identifier), an indication of the item that was encrypted (e.g., an identifier corresponding to the data such as an identifier of a dataset, an identifier for a key, an identifier corresponding to a key envelope, etc.), an indication of the key used to encrypt item (e.g., one or more of an identifier for the key, a version of the key, etc.), etc. In some embodiments, key metadata module 330 stores the information pertaining to an encryption/decryption event at least partially in the tenant database such as on database service layer 105. For example, key metadata module 330 stores the information/metadata in one or more metadata tables (e.g., a key metadata table such as the example illustrated in FIG. 5). In some implementations, part of key metadata (e.g., metadata pertaining to encryption of one or more keys used in connection with encrypting data on the tenant database) is stored on a tenant database, and part of the key metadata is stored on the KMS. In some implementations, information sufficient to determine each key used in connection with encrypting data and one or more key(s) used to encrypt a key used to encrypt the data (e.g., a key(s) used to encrypt the TSEK, etc.) is stored at the tenant database (e.g., in one or more transaction records of a tenant database). For example, the tenant database stores (i) key metadata (e.g., an indication) of the TSEK used to encrypt a particular set of data, (ii) key metadata of the TKEK used to encrypt the TSEK, (iii) key metadata of the CWK used to encrypt the TSEK or a key envelope pertaining to the encryption of the TSEK using the TKEK, and/or (iv) a key envelope pertaining to the encryption of the TSEK using the TKEK further encrypted by the CWK. As another example, the tenant database stores an indication of the BTWK used in connection with encrypting (i) the TKEK or a key envelope pertaining to the encryption of the TSEK using the TKEK, or (ii) the CWK or a key envelope pertaining to the encryption of the TSEK using the TKEK further encrypted by the CWK. As an example, BTWK is used based on whether the entity corresponding to the tenant database (e.g., the customer) has enabled a "bring your own key" feature for use in connection with encrypting the TKEK (e.g., if such feature is enabled the BTWK used is the key so selected/identified by the customer).

According to various embodiments, system 300 comprises tenant service encryption key (TSEK) encryption/decryption module 335. System 300 uses TSEK encryption/decryption module 335 to encrypt/decrypt the TSEK (e.g., a key that is used to encrypt the data stored in the tenant database). In some embodiments, system 300 determines the key to use to encrypt the TSEK (e.g., the TKEK to use to encrypt the TSEK), encrypts the TSEK, and provides metadata (e.g., key metadata) pertaining to the event of encrypting the TSEK to key metadata module 330 to store such metadata. In some embodiments, system 300 determines the key(s) to encrypt the TSEK (or corresponding key envelope) based at least in part on the entity associated with the tenant database (e.g., the customer) and/or a tenant of the entity (e.g., an identifier associated with the tenant). TSEK encryption/decryption module 335 encrypts/decrypts the TSEK (or corresponding key envelope) based at least in part on the determined key(s) used for encryption/decryption. As an example, TSEK encryption/decryption module 335 encrypts the TSEK (or corresponding key envelope) using the TKEK corresponding to the entity and/or tenant associated with the tenant (e.g., the tenant corresponding to the tenant database). In some embodiments, in response to determining that the "bring your own key" feature is enabled for use in connection with encrypting the TKEK, TSEK encryption/decryption module 335 determines to use the applicable BYOK tenant wrapper key (BTWK) to encrypt the TKEK (or corresponding key envelope) after the TKEK is used to encrypt the TSEK. For example, if TSEK encryption/decryption module 335 determines that a BTWK is to be used in connection with encrypting/decrypting a TKEK, TSEK encryption/decryption module 335 communicates BTWK information to system 200, which then communicates with one or more third party KMSs to request that the BTWK be used for such encryption/encryption. For example, the key or corresponding key envelope (e.g., the ciphertext) to be encrypted by the selected BTWK (e.g., the BTWK corresponding to the entity) is sent to the third party management service from system 200, the third party key management uses the BTWK to encrypt/decrypt the key or corresponding key envelope (e.g., the ciphertext), and third party KMS returns the result of such encryption/decryption. In some embodiments, in response to determining that a BTWK is to be used in connection with encrypting/decrypting a TKEK (e.g., for use to encrypt/decrypt the TSEK), TSEK encryption/decryption module 335 communicates a request/indication to the third party management service to perform (or manage/coordinate performance of) the encrypting/decrypting of the TKEK (or corresponding key envelope) using the BTWK. In some embodiments, in the case that a TKEK is further encrypted/decrypted using a wrapper key such as CWK stored on KMS, a request is sent to the KMS to encrypt/decrypt TKEK (or corresponding key envelope) using the CWK. In some embodiments, the TKEK (or corresponding key envelope) is encrypted/decrypted with the CWK and the BTWK (e.g., in series).

In some embodiments, system 300 comprises data encryption/decryption module 340. System 300 uses data encryption/decryption module 340 to encrypt/decrypt data such as data stored in the tenant database. In response to receiving a request to access the data (e.g., a query to be run against the data, a request to spin up the data to run queries against the data, etc.), data encryption/decryption module 340 determines whether the data is to be decrypted (e.g., whether the data has been decrypted and cached, whether the request to access the data has or is associated with the requisite permissions, etc.). In response to determining to decrypt the data, data encryption/decryption module 340 determines the key (or set of keys) to use in connection with decrypting the data. For example, data encryption/decryption module 340 determines the key(s) to encrypt/decrypt data based at least in part on one or more of identifier corresponding to the data, an indication of the tenant with which the data is associated (e.g., an identifier of the tenant), etc. In some embodiments, data encryption/decryption module 340 determines the key(s) to decrypt data based at least in part on key metadata such by performing a lookup in a database or table comprising information indicating key(s) used to encrypt data (e.g., a mapping of key(s) to data)

and/or information indicating key(s) used to encrypt the TSEK. In response to receiving a request to access the data, determining the data is to be decrypted, and the TSEK to be used to decrypt the data, data encryption/decryption module 340 decrypts the data using the TSEK. In some embodiments, data encryption/decryption module 340 decrypts the data using the TSEK comprising communicating a request to decrypt the TSEK such as to the TSEK encryption/decryption module 335.

In some embodiments, system 300 comprises key management service connector module 345. System 300 uses key management service connector module 345 to communicate with the KMS. For example, in the case of the tenant database, the database layer 105 uses key management service connector module 345 to communicate with KMS (e.g., key management service layer 115). Key management service connector module 345 is used to communicate with KMS in connection with encrypting/decrypting the data stored on tenant database. For example, system 300 communicates with KMS to use the applicable wrapper key (e.g., CWK) and/or top-level key to encrypt/decrypt a key such as the TKEK (or corresponding key envelope). Key management service connector module 345 may be configured the information/request to be communicated with the KMS such as via an API or other protocol. In some embodiments, key management service connector module 345 communicates with the KMS via communication module 325.

In some embodiments, system 300 does not directly connect to one or more third party KMSs, but instead system 200 directly connects to one or more third party KMSs. As an example, one or more third party KMSs stores a top-level key that is used in connection with encrypting/decrypting data or services, or key(s) used to encrypt/decrypt the data or services. In some embodiments, system 300 indirectly connects via system 200 to different third party KMSs based on a location of a top-level key. For example, a first entity uses a first third party KMS (e.g., Amazon Web Services™) to store a top-level key in an HSM, and a second entity uses a second third party KMS (e.g., Microsoft Azure™) to store a top-level key in an HSM. Accordingly, system 300 indirectly via system 200 selectively connects to the first third party KMS or the second third party KMS based on whether the top-level key being used is for the first entity or the second entity. In some implementations, an entity has one or more top-level keys stored across one or more third party KMSs. In some embodiments, system 300 indirectly via system 200 selectively connects to the one or more third party KMSs to obtain or use the applicable top-level key. For example, system 300 indirectly via system 200 uses an Application Programming Interface (API) associated with one or more third party KMSs (or other predefined communication protocol/syntax) to communicate with the third party KMS. As an example, system 300 indirectly via system 200 communicates a key or key envelope (e.g., ciphertext) to the applicable third party KMS in connection with requesting that the third party service use the top-level key to encrypt/decrypt the key or key envelope (e.g., ciphertext). In some embodiments, system 300 indirectly via system 200 indicates the entity or HSM associated with the, or an identifier of the top-level key to be used to encrypt/decrypt the key or key envelope (e.g., ciphertext). In some embodiments, system 300 indirectly via system 200 communicates with the third party KMS to encrypt the TKEK, or corresponding key envelope such as an envelope corresponding to the TKEK encrypted using the CWK.

According to various embodiments, storage 315 comprises one or more of filesystem data 360, tenant data 365, and/or key wrapper data 370. Storage 315 comprises a shared storage (e.g., a network storage system) and/or database data, and/or user activity data. In some embodiments, filesystem data 360 comprises a database such as one or more datasets (e.g., one or more datasets for one or more tenants, etc.). Filesystem data 360 comprises data such as a dataset for training a machine learning process, historical information pertaining user activity, a human resources database, a financial database, etc.). In some embodiments, tenant data 365 comprises information pertaining to a tenant or an entity associated with a tenant, such as tenant preferences or settings, cached decrypted keys, key permissions, etc. In some embodiments, key wrapper data 370 comprises information pertaining to key metadata or other information pertaining to an encryption of a key or data such as data stored on the tenant database. As an example, key wrapper data 370 comprises one or more mapping tables of encryption keys to data, or encryption keys to key envelopes.

According to various embodiments, memory 320 comprises executing application data 375. Executing application data 375 comprises data obtained or used in connection with executing an application such as an application executing on a tenant. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 4:
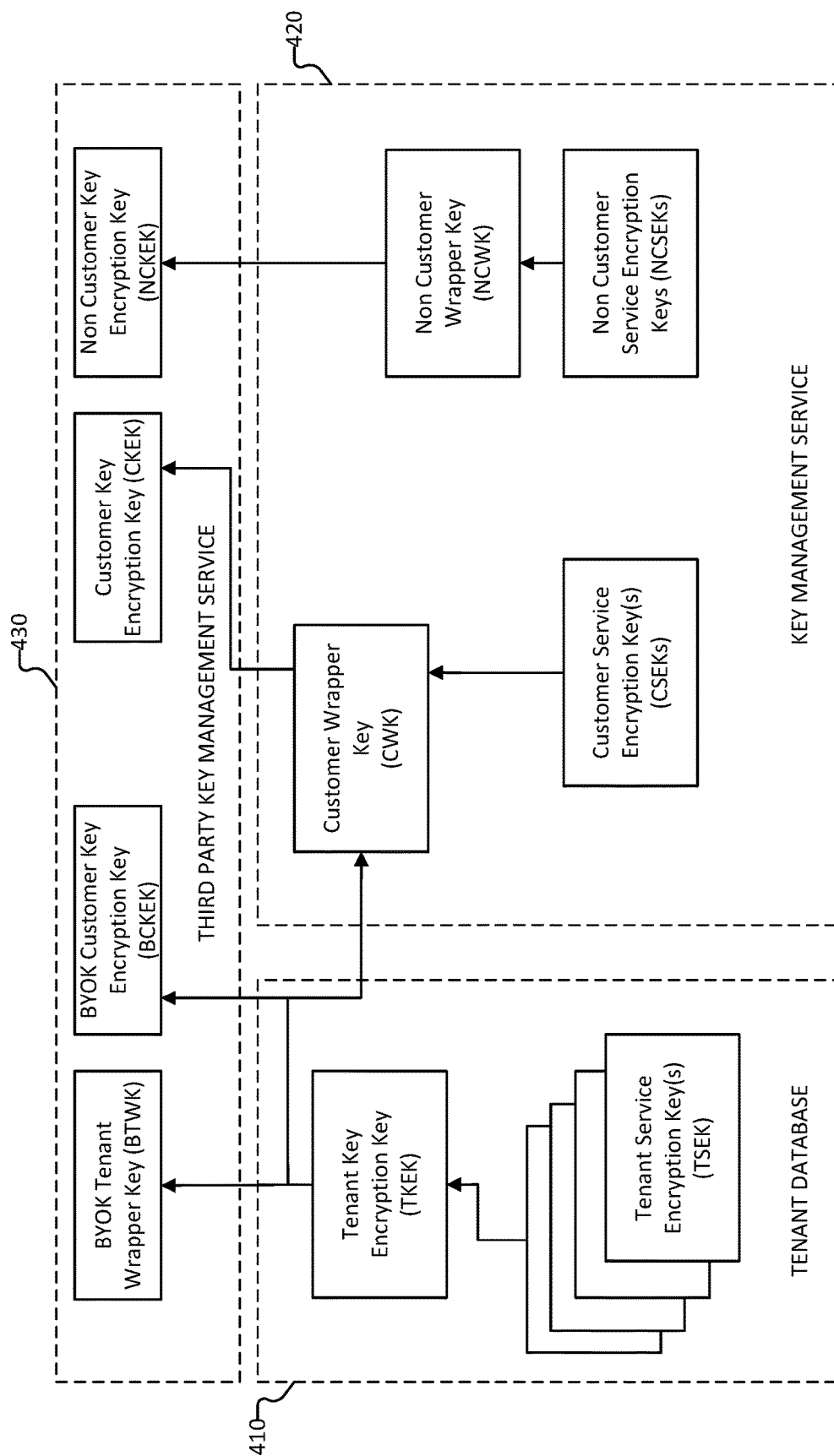
FIG. 4 is a block diagram of a system according to various embodiments of the present application.

FIG. 4 is a block diagram of a system according to various embodiments of the present application. In some embodiments, system 400 comprises, or corresponds to, a system for encrypting/decrypting data stored in a tenant database and/or for using and managing keys used to encrypt/decrypt data. System 400 may implement at least part of system 100 of FIG. 1, system 200 of FIG. 2, system 300 of FIG. 3, encryption information 500 of FIG. 5, process 600 of FIG. 6, process 700 of FIG. 7, process 800 of FIG. 8, and/or process 900 of FIG. 9.

In the example illustrated, system 400 comprises tenant database 410, KMS 420, and/or third party key management service 430. According to various embodiments, KMS 420 mediates access to (e.g., requests sent) to a KMS to use a top-level key such as a CKEK or a BCKEK in connection with encrypting data stored in tenant database and/or a key or key envelopes, such in the case of an encryption of the TKEK.

According to various embodiments, in response to determining that data (e.g., a particular dataset) is to be decrypted, system 400 obtains an identifier of the TSEK used to encrypt the data (e.g., system 400 obtains a UUID for the TSEK from KMS 420). In response to obtaining the identifier of the TSEK, KMS 420 determines information associated with the TSEK. For example, KMS 420 performs a lookup to determine metadata pertaining the key. KMS 420 uses the identifier of the TSEK (e.g., the UUID for the TSEK) to determine an identifier associated with a wrapper or key envelope associated with wrapping the TSEK (e.g., a UUID of the wrapper that wraps the TSEK). In response to determining the identifier associated of the wrapper or key envelope associated with wrapping the TSEK, KMS 420 determines key metadata for the TKEK (e.g., the key metadata is determined based at least in part on the identifier of the wrapper such as by performing a lookup of to determine a key used to wrap the wrapper, etc.). In response to determining the key metadata for the TKEK, KMS 420 determines an identifier for the wrapper of the TKEK (e.g., a UUID associated with the wrapper of the TKEK). For example, KMS 420 determines an identifier of a key(s) used to wrap the TKEK such as the CWK and/or the BTWK. In some embodiments, the determining the identifier of the wrapper of the TKEK is obtained from tenant database 410 (e.g., based at least in part on a metadata table, etc. stored on tenant database 410).

In response to determining the identifier of the wrapper of the TKEK, key metadata pertaining to the one or more keys used to wrap the TKEK. In the case that the TKEK is wrapped by a CWK which is in turn wrapped by a BYOK tenant wrapper key (BTWK) (e.g., before being wrapped by a top-level key), KMS 420 uses an identifier (e.g., UUID) of the CWK to perform a lookup of key metadata for the CWK. In response to obtaining the key metadata for the CWK, an identifier of the top-level key (e.g., the CKEK or BCKEK) used to wrap the CWK is determined. KMS 420 determines (e.g., performs a lookup) for information pertaining to the top-level key (e.g., a location of the top-level key such as a particular third party KMS, a corresponding HSM, an indication of whether the top-level key is entity-provided or service-provider provided, etc.). In response to determining the information pertaining to the top-level key, KMS 420 uses such information in connection with sending the CWK (e.g., the ciphertext for the CWK) to third party key management service 430. The HSM of third party key management service 430 in which the top-level key is stored decrypts the ciphertext for the CWK and provides the CWK (e.g., the decrypted CWK) to KMS 420. KMS 420 uses an identifier (e.g., UUID) of the BTWK and sends the ciphertext for the TKEK to the third party management service in which the BTWK is stored (e.g., third party key management service 430), and the third party management service uses the BTWK stored in a corresponding HSM to decrypt the ciphertext for TKEK. KMS 420 is provided with a decrypted ciphertext for the TKEK, which corresponds to a TKEK wrapped using the CWK. In response to receiving the decrypted ciphertext for the TKEK, KMS 420 uses the CWK to further decrypt the decrypted ciphertext for the TKEK, and KMS 420 obtains the TKEK. In response to obtaining the TKEK (e.g., the decrypted TKEK), KMS 420 provides the TKEK to tenant database 410. A tenant database layer comprising or residing on tenant database 410 uses TKEK to decrypt the ciphertext for the TSEK (e.g., the key envelope for the TSEK). In response to receiving the TSEK, the TSEK is provided to a service that requested the TSEK such as a service that is attempting to access the data that was encrypted by the TSEK. The service to which the TSEK is provided may run on a layer on which KMS 420 resides.

In the case that the TKEK is wrapped by a CWK and not further wrapped by a BTWK (e.g., before being wrapped by a top-level key), the CWK is used to decrypt the ciphertext for the TKEK after the CWK is returned to KMS 420 from the third party key management service 430.

In some embodiments, a service is encrypted by a key such as a customer service encryption key (CSEK). In response to receiving a request to access the service, an identifier pertaining to a key used to encrypt the service (e.g., a UUID for the CSEK) is provided to KMS 420. In response to receiving the identifier for the CSEK, KMS 420 determines key metadata pertaining to the CSEK. For example, KMS 420 uses the UUID for the CSEK to perform a lookup for the key metadata pertaining to the key used to wrap the CSEK (e.g., the CWK). For example, KMS 420 determines an identifier corresponding to a wrapper used to wrap the CSEK (e.g., the UUID for the CWK). In response to determining the identifier corresponding to a wrapper used to wrap the CSEK, KMS 420 uses such identifier (e.g., the UUID for the CWK) to perform a lookup and obtain corresponding key metadata (e.g., key metadata for the CWK). KMS 420 uses the key metadata to obtain an identifier of top-level key used in connection with encrypting the CWK. For example, KMS 420 uses the key metadata for the CWK to perform a lookup to obtain an identifier for the top-level key (e.g., a UUID for the CKEK, a UUID for the BCKEK, etc.). In response to determining the identifier for the top-level key, KMS 420 determines information pertaining to the top-level key (e.g., a location of the top-level key such as a particular third party KMS, a corresponding HSM, an indication of whether the top-level key is entity-provided or service-provider provided, etc.). In response to determining the information pertaining to the top-level key, KMS 420 uses such information in connection with sending the CWK (e.g., the ciphertext for the CWK) to third party key management service 430. The HSM of third party key management service 430 in which the top-level key is stored decrypts the ciphertext for the CWK and provides the CWK (e.g., the decrypted CWK) to KMS 420. In response to receiving the decrypted CWK, KMS 420 uses the CWK to further decrypt ciphertext for the CSEK, and KMS 420 obtains the CSEK. In response to obtaining the CSEK, KMS 420 provides CSEK to the service that requested access to the CSEK.

FIG. 5 is a diagram of a key metadata according to various embodiments of the present application. In some embodiments, the system stores information pertaining to encryption events. For example, the system stores information pertaining to one or more keys associated with encrypting data stored in a tenant database, or a customer service. Encryption information 500 is an example of information stored by the system in connection with encrypting data stored on the tenant database. Encryption information 500 may be implemented by system 100 of FIG. 1, system 200 of FIG. 2, and/or system 300 of FIG. 3. Encryption information 500 may be stored in connection with process 600 of FIG. 6, process 700 of FIG. 7, process 800 of FIG. 8, and/or process 900 of FIG. 9.

According to various embodiments, encryption information 500 comprises key metadata 510, key event information 520, key envelope information 530, and/or BYOK information 540. In some embodiments, encryption information 500 further includes a mapping of a BYOK keys to key envelopes (e.g., a mapping of identifiers for BYOK keys to identifiers for key envelope), and/or a record of an event that changes a state of a key to audit/track actions pertaining to keys used in connection with encrypting/decrypting data.

In the example illustrated in FIG. 5, key metadata 510 includes one or more of a record number, a version identifier (e.g., a value) pertaining to a version of a corresponding key, a name of the corresponding key, an identifier (e.g., a UUID of the key), a ciphertext for the corresponding key (e.g., a safety validation such as a cipher corresponding to a selected/arbitrary data that is encrypted using the key), and time information corresponding to a time/date when the key was created.

In the example illustrated in FIG. 5, key event information 520 includes one or more of a record number, an event type, an identifier for the corresponding key metadata, and a timestamp corresponding to a time/date when the event metadata was generated. According to various embodiments, key metadata 520 stores information pertaining to a state of keys. In some embodiments, the event type indicates an event that caused a state of a key to change. Examples of the event types are: generated, active, disabled, revoked, and destroyed. Generated corresponds to a key that is created but not actively used (e.g., is not used to encrypt data in the tenant database). Active corresponds to a key that is actively in use such as for encrypting data in the tenant database. Disabled corresponds to a key that has been disabled. In some embodiments, if the state of a key is set to disabled, the key can only be used for decryption (e.g., no further data is to be encrypted using such key). Revoked corresponds to a key that is revoked and is not able to be used for encryption or decryption of data, but the key still exists. Destroyed corresponds to a key that no longer exists.

In the example illustrated in FIG. 5, key envelope information 530 comprises information pertaining to the key such as the key envelope. For example, key envelope information 530 includes one or more of a record number, a wrapper identifier (e.g., a UUID for the wrapper such as a UUID for a key), a key metadata identifier (e.g., the key metadata identifier may correspond to information included in the key metadata for the key, etc.), and a time/date when the key envelope was encrypted or created, and ciphertext corresponding to the key envelope.

In the example illustrated in FIG. 5, BYOK information 540 comprises information pertaining to a top-level key or a BYOK key. For example, BYOK information 540 comprises one or more of a record, a key metadata identifier (e.g., the key metadata identifier may correspond to information included in the key metadata for the key, etc.), and information indicating a third party key management server on which the corresponding key (e.g., the BCKEK, the CKEK, and/or the BTWK) is stored.

Figure 6:
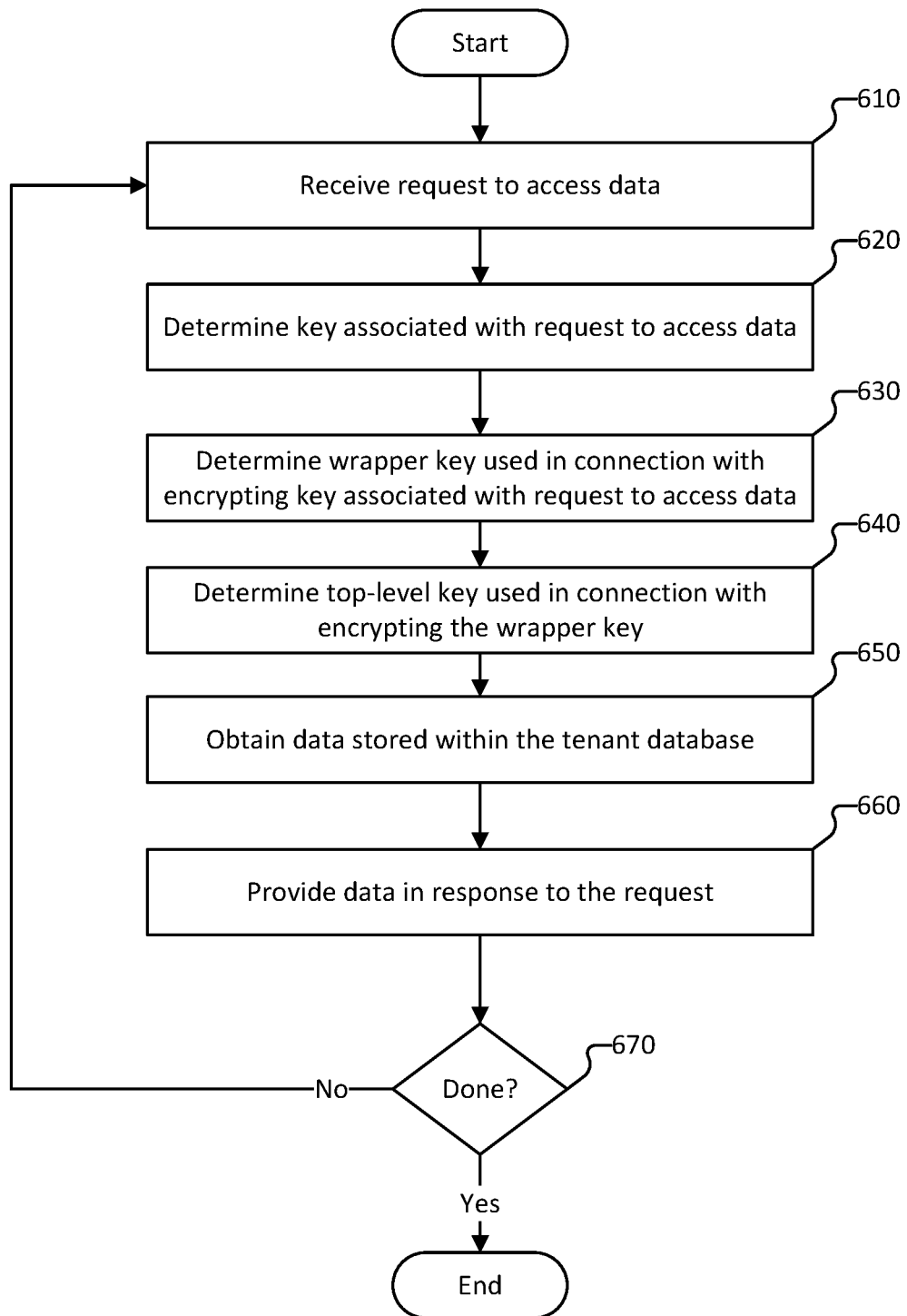
FIG. 6 is a flow diagram of a method for encrypting/decrypting data according to various embodiments of the present application.

FIG. 6 is a flow diagram of a method for encrypting/decrypting data according to various embodiments of the present application. In some embodiments, process 600 is implemented by system 100 of FIG. 1, system 200 of FIG. 2, and/or system 300 of FIG. 3. Process 600 is implemented in connection with decrypting data stored in the tenant database. In some embodiments, process 600 is performed by one or more servers.

At 610, a request to access data is received. In some embodiments, the request to access data is received in connection with a user accessing data stored in a tenant base such as one or more datasets pertaining to a service provided to the tenant or entity corresponding to the tenant. In some embodiments, the system receives the request to access data in response to a determination that the data in the tenant database is encrypted and is to be decrypted in order to provide the data (or portion thereof) to a customer (e.g., the entity) or a user of the customer to with access to the data or the service that uses the data. Examples of the service is a human resources system that generates reports pertaining to users/employees of a customer, a human resources system that accepts, runs, and responds to queries against a dataset comprising information pertaining to an organization such as users/employees of a customer. In some embodiments, the request to access data corresponds to, or is generated in response to, a query received from a user where the query is to be run against one or more datasets.

According to various embodiments, data stored in the tenant database (e.g., one or more datasets) are cached in a decrypted state for a predefined period of time. As an example, the period of time for which the data is cached in the decrypted state is configurable such as by an administrator of the entity corresponding to the tenant (e.g., by an administrator of the customer).

At 620, a key associated with the request to access data is determined. In some embodiments, in response to receiving the request to access the data (e.g., determining that the data is to be decrypted), a key associated with the request to access the data is determined. According to various embodiments, the key associated with the request to access the data comprises one or more keys that are used to encrypt the data (e.g., and that are to be used in connection with decrypting the data).

In some embodiments, the key associated with the request to access data is determined based at least in part on the data corresponding to the request to access the data. For example, a service attempting to access the data provides an identifier of a key (e.g., a TSEK) that is used to encrypt the data. The determining the key associated with the request to access the data includes determining information pertaining to the key corresponding to the identifier of the key. For example, the system performs a lookup to determine a wrapper associated with the key (e.g., an identifier of the wrapper of the TSEK).

At 630, a wrapper key used in connection with encrypting the key associated with the request to access data is determined. In some embodiments, in response to determining the key associated with the request to access data, the system determines one or more keys used to wrap the key associated with the request to access the data. For example, in response to determining the TSEK that encrypts the data stored in the tenant database, the system determines one or more keys used to wrap/encrypt the TSEK. Examples one or more keys used to wrap the key associated with the request to access the data include: a TKEK, a CWK, and/or a BTWK.

In some embodiments, the one or more keys (e.g., wrapper keys) used to wrap the key (e.g., the TSEK) are determined based at least in part on encryption information such as encryption information 500 of FIG. 5. For example, the system performs one or more look ups using the identifier of the wrapper and in turn identifiers of the key(s) corresponding to the wrapper to determine the one or more wrapper keys. As an example, the system determines a wrapper identifier used to wrap the TSEK, determines key metadata of a key corresponding to the wrapper identifier. As another example, in the case that a plurality of wrapper keys are used in connection with encrypting the data, the system determines a wrapper identifier used to wrap the TSEK, determines key metadata of a first wrapper key (e.g., the TKEK) corresponding to the wrapper identifier, determines a wrapper identifier used to the first wrapper key, and in turn determines key metadata corresponding to the wrapper of the first wrapper key (e.g., key metadata corresponding to the CWK and/or BTWK).

At 640, a top-level key used in connection with encrypting the wrapper key is determined. In some embodiments in response to determining the wrapper key (e.g., the CWK), the system determines a top-level key used to encrypt/wrap the wrapper key. As an example, at least one wrapper key (e.g., the CWK) is stored at a KMS, and the top-level key is stored in one or more third party KMSs. In some embodiments, the determining the top-level key further comprises determining one or more third party KMSs in which the top-level key is stored (e.g., in the case that the KMS is configured to connect to a plurality of third party KMSs). For example, the system determines the third party KMS, and an account identifier and/or HSM with which the top-level key is associated.

According to various embodiments, the top-level key is provided/managed by the service provider or provided/managed by an entity such as a customer of the service provider. As an example, the customer selectively configures the system (e.g., the data security of the data in the tenant database) to use a top-level key provided/managed by the service provider (e.g., a CKEK) or a top-level key provided/managed by the customer (e.g., a BCKEK). As another example, the customer configures a permissions for access to a top-level key provided/managed by the customer (e.g., the customer configures the third party KMS to restrict access or calls to the BCKEK to a service provider, a tenant of the customer, or other security policy for using the BCKEK to decrypt data stored in the tenant database, etc.).

In some embodiments, the system determines the top-level key based at least in part on key metadata pertaining to the wrapper key (e.g., the CWK). For example, the system uses an identifier of the CWK to perform a look up for key metadata associated with the CWK. The key metadata associated with the CWK comprises an identifier of the top-level key and/or information pertaining to the top-level key. The system uses the identifier of the top-level key and/or the information pertaining to the top-level key to look up location information of the top-level key such as an identifier of the third party KMS and/or associated account information at which the top-level key is stored.

According to various embodiments, the system obtains one or more of the keys used in connection with the encrypting the data from a cache. For example, before decrypting an encrypted version of a key (e.g., ciphertext for: TSEK, TKEK, CWK, etc.), the system determines whether a cached version of the key is stored (e.g. a copy of a previously decrypted key). In some embodiments, in response to determining a key in process 600, the system determines whether a cached version of the key is stored (e.g., by performing a lookup in the cache using an identifier of the key) before determining key metadata for the key and/or another key that was used to wrap/encrypt the key.

At 650, data stored within the tenant database is obtained. In some embodiments, the system obtains the data stored within the tenant database (e.g., the data responsive to the request to access data) based at least in part on decrypting the data. For example, the data is decrypted using the top-level key (e.g., the CKEK or the BCKEK), the wrapper key(s) (e.g., the CWK), and the key associated with the request to access data (e.g., the TSEK).

According to various embodiments, the system decrypts at least one wrapper key (e.g., the CWK) based at least in part on the top-level key. For example, the KMS sends a request to the third party KMS to use the top-level key to decrypt the CWK. As another example, the KMS sends an encrypted version of the CWK such as ciphertext for the CWK to the third party KMS, the third party KMS uses the applicable top-level key stored in a corresponding HSM to decrypt the encrypted version of the CWK to obtain the CWK, and the third party KMS provides the CWK to the KMS. In response to receiving the CWK (e.g., the decrypted version of the CWK), the system uses the CWK in connection with obtaining the key associated with the request to access data such as the TSEK (e.g., the system uses the CWK in connection with decrypting a wrapper of the TSEK).

In some embodiments, in response to receiving the CWK (e.g., the decrypted version of the CWK), the system (e.g., the KMS) uses the CWK to decrypt a wrapper of another key used to encrypt/wrap the key associated with the request to access data. For example, the KMS uses the CWK to decrypt a wrapper of the TKEK (e.g., the CWK is used to decrypt ciphertext for the TKEK). In response to obtaining the TKEK, the system (e.g., a KMS on the tenant database) uses the TKEK to decrypt an encrypted version of the TSEK (e.g., the TKEK is used to decrypt ciphertext for the TSEK). In response to obtaining the TSEK, the system (e.g., a KMS on the tenant database) uses the TSEK to decrypt the data.

At 660, the data is provided in response to the request to access the data. According to various embodiments, in response to the data being decrypted, the data is provided in response to the request to access the data. For example, the data is provided to a service that requested or for which the data is decrypted. As another example, the data is used to spin up a service to provide information to a user such as user associated with the tenant (e.g., to respond to a query, to generate and provide a report, etc.).

At 670, a determination is made as to whether process 600 is complete. In some embodiments, process 600 is determined to be complete in response to a determination that no further data is to be decrypted in connection with the request to access data, no further requests to access data are received (e.g., within a threshold period of time), the user has exited the system, an administrator indicates that process 600 is to be paused or stopped, etc. In response to a determination that process 600 is complete, process 600 ends. In response to a determination that process 600 is not complete, process 600 returns to 610.

Figure 7:
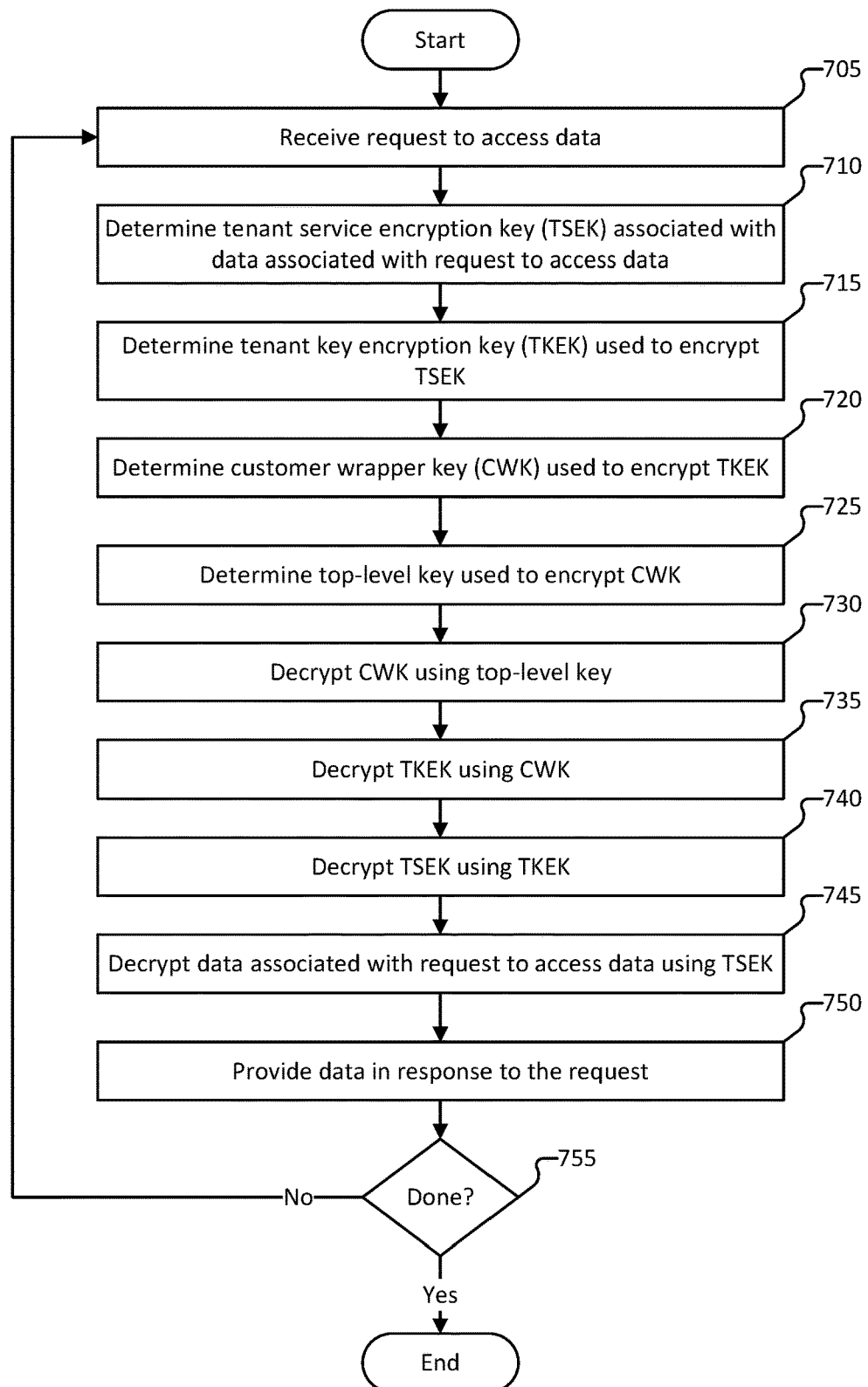
FIG. 7 is a flow diagram of a method for encrypting/decrypting data according to various embodiments of the present application.

FIG. 7 is a flow diagram of a method for encrypting/decrypting data according to various embodiments of the present application. In some embodiments, process 700 is implemented by system 100 of FIG. 1, system 200 of FIG. 2, and/or system 300 of FIG. 3. Process 700 is implemented in connection with decrypting data stored in the tenant database. In some embodiments, process 700 is performed by one or more servers.

At 705, a request to access data is received. In some embodiments, the receiving the request to access data is implemented similar to the manner in 610 of process 600 of FIG. 6.

At 710, a TSEK associated with the data associated with the request to access data is determined. In some embodiments, in response to receiving the request to access the data (e.g., determining that the data is to be decrypted), the TSEK used to encrypt the data is determined.

In some embodiments, the key associated with the request to access data is determined based at least in part on the data corresponding to the request to access the data. For example, a service attempting to access the data provides an identifier of a key (e.g., a TSEK) that is used to encrypt the data.

At 715, a TKEK used to encrypt the TSEK is determined. In some embodiments, in response to determining the TSEK (e.g., the key used to encrypt the data), the system (e.g., a KMS running on a tenant database layer) determines (e.g., obtains) key metadata corresponding to the TSEK, and the system determines an identifier associated with a key (e.g., the TKEK) used to wrap/encrypt the TSEK. For example, the system obtains key metadata corresponding to the TSEK, and determines a UUID associated with the wrapper of the TSEK (e.g., the UUID of the TKEK used to encrypt the TSEK).

At 720, a CWK used to encrypt the TKEK is determined. In some embodiments, in response to determining the TKEK (e.g., the key used to encrypt the TSEK), the system (e.g., a KMS running on a tenant database layer) determines (e.g., obtains) key metadata corresponding to the TKEK, and the system determines an identifier associated with a key (e.g., the CWK) used to wrap/encrypt the TKEK. For example, the system obtains key metadata corresponding to the TKEK, and determines a UUID associated with the wrapper (e.g., the UUID of the CWK used to encrypt the TKEK).

At 725, a top-level key used to encrypt the CWK is determined. In some embodiments, in response to determining the CWK (e.g., the key used to encrypt the TKEK), the system (e.g., the KMS) determines (e.g., obtains) key metadata corresponding to the CWK, and the system determines an identifier associated with a top-level key (e.g., the CKEK, the BCKEK, etc.) used to wrap/encrypt the CWK. For example, the system obtains key metadata corresponding to the CWK, and determines a UUID associated with the top-level key (e.g., the UUID of the top-level key used to encrypt the CWK).

In some embodiments, in response to the KMS running on a tenant database layer determining the CWK, the KMS running on the tenant database layer provides to the KMS an identifier associated with CWK, the KMS obtains key metadata corresponding to the CWK, and the KMS determines the top-level key based at least in part on the key metadata corresponding to the CWK.

In some embodiments, the determining the top-level key further comprises determining one or more third party KMSs in which the top-level key is stored (e.g., in the case that the KMS is configured to connect to a plurality of third party KMSs). For example, the system determines the third party KMS, and an account identifier and/or HSM with which the top-level key is associated.

At 730, the CWK is decrypted using the top-level key. In some embodiments, the top-level key is used to decrypt an encrypted version of the CWK (e.g., ciphertext for the CWK).

According to various embodiments, the KMS sends a request to the third party KMS to use the top-level key to decrypt the CWK. In some embodiments, the KMS sends an encrypted version of the CWK such as ciphertext for the CWK to the third party KMS, the third party KMS uses the applicable top-level key stored in a corresponding HSM to decrypt the encrypted version of the CWK to obtain the CWK, and the third party KMS provides the CWK to the KMS.

At 735, the TKEK is decrypted using the CWK. In response to receiving the CWK (e.g., the decrypted version of the CWK), the system uses the CWK in connection with obtaining the TKEK. For example, the KMS uses the CWK to decrypt a wrapper of the TKEK (e.g., the CWK is used to decrypt ciphertext for the TKEK).

At 740, the TSEK is decrypted using the TKEK. In response to obtaining the TKEK, the system (e.g., a KMS on the tenant database) uses the TKEK to decrypt an encrypted version of the TSEK (e.g., the TKEK is used to decrypt ciphertext for the TSEK).

At 745, the data associated with the request to access data is decrypted using the TSEK. In response to obtaining the TSEK, the system (e.g., a KMS on the tenant database) uses the TSEK to decrypt the data.

At 750, the data responsive to the request to access data is provided. In some embodiments, the providing the data associated with the request to access data is implemented similar to the manner in 660 of process 600 of FIG. 6.

At 755, a determination is made as to whether process 700 is complete. In some embodiments, process 700 is determined to be complete in response to a determination that no further data is to be decrypted in connection with the request to access data, no further requests to access data are received (e.g., within a threshold period of time), the user has exited the system, an administrator indicates that process 700 is to be paused or stopped, etc. In response to a determination that process 700 is complete, process 700 ends. In response to a determination that process 700 is not complete, process 700 returns to 705.

According to various embodiments, before determining a second key to encrypt/wrap a first key, the system determines whether a decrypted version of the first key is cached, and if the first key is determined to be cached, the first key is obtained and used to decrypt the data or other key for which the first key was used to encrypt. For example, with reference to process 700 of FIG. 7, before proceeding from 710 to 715, the system determines whether a decrypted version of the TSEK is cached and if so, the decrypted version of the TSEK is obtained and process 700 proceeds to 745. As another example, before proceeding from 715 to 720, the system determines whether a decrypted version of the TKEK is cached and if so, the decrypted version of the TKEK is obtained and process 700 proceeds to 740. As another example, before proceeding from 720 to 725, the system determines whether a decrypted version of the CWK is cached and if so, the decrypted version of the CWK is obtained and process 700 proceeds to 735. In some embodiments, a key is cached for a predetermined period of time (e.g., the period of time is configurable such as by the customer associated with the tenant database).

Figure 8:
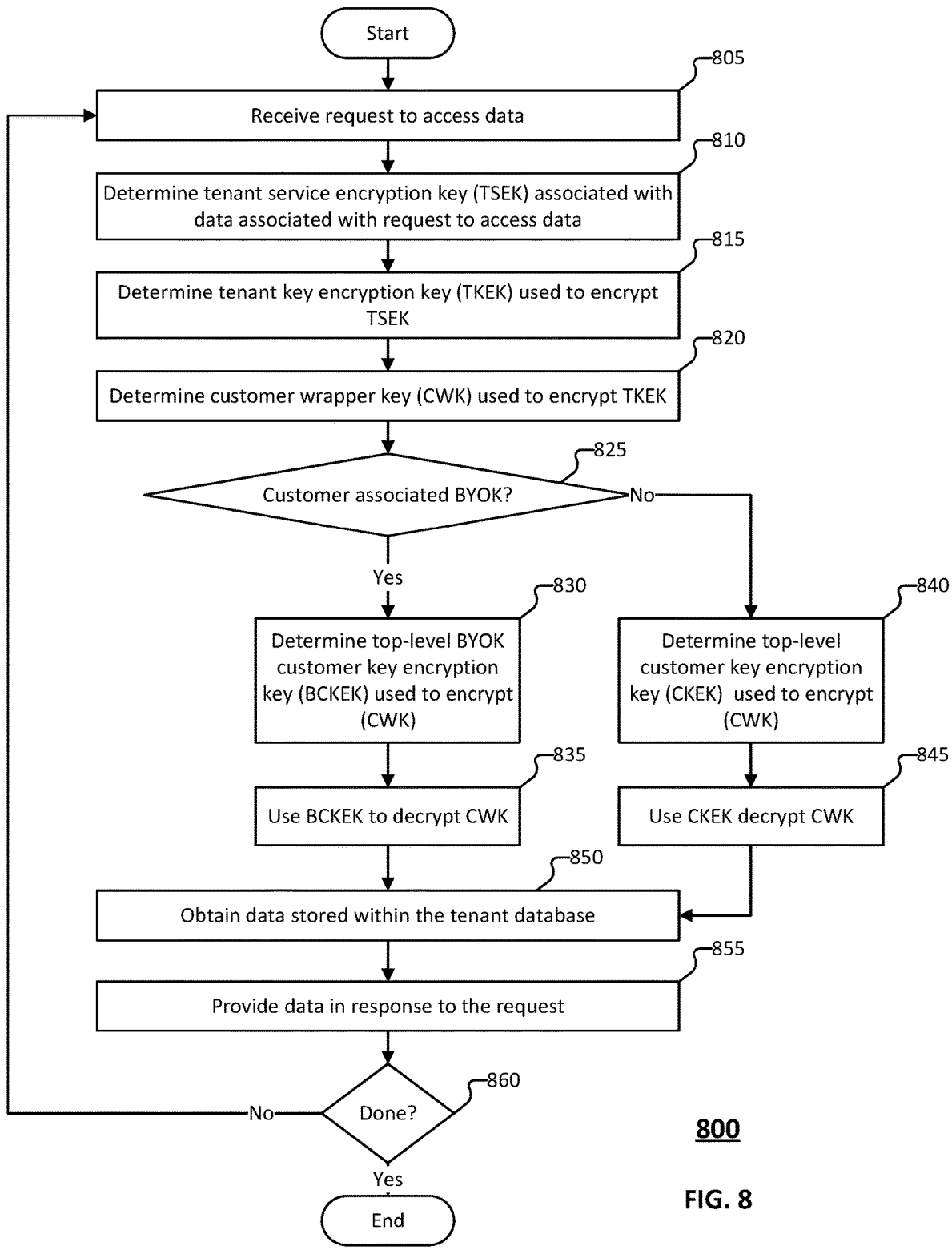
FIG. 8 is a flow diagram of a method for encrypting/decrypting data according to various embodiments of the present application.

FIG. 8 is a flow diagram of a method for encrypting/decrypting data according to various embodiments of the present application. In some embodiments, process 800 is implemented by system 100 of FIG. 1, system 200 of FIG. 2, and/or system 300 of FIG. 3. Process 800 is implemented in connection with decrypting data stored in the tenant database. In some embodiments, process 800 is performed by one or more servers.

At 805, a request to access data is received. In some embodiments, the receiving the request to access data is implemented similar to the manner in 705 of process 700 of FIG. 7.

At 810, a TSEK associated with the data associated with the request to access data is determined. In some embodiments, the determining the TSEK is implemented similar to the manner in 710 of process 700 of FIG. 7.

At 815, a TKEK used to encrypt the TSEK is determined. In some embodiments, the determining the TSEK is implemented similar to the manner in 715 of process 700 of FIG. 7.

At 820, a CWK used to encrypt the TKEK is determined. In some embodiments, the determining the CWK is implemented similar to the manner in 720 of process 700 of FIG. 7.

At 825, a determination is made as to whether a customer associated BYOK is used as a top-level key. In some embodiments, the system determines whether a BYOK feature is enabled for the customer. For example, the system determines whether a value/setting of a field indicating a state for the BYOK feature has been set as enabled or disabled. As another example, the system determines whether the BYOK feature is enabled for the customer based at least in part on the top-level key used to encrypt the CWK (e.g., if the top-level key corresponds to a top-level key of the service provider, then the BYOK feature may be deemed to be disabled, etc.).

In response to a determination that a customer associated BYOK is used as a top-level key at 825, process 800 proceeds to 830 at which the BCKEK used to encrypt the CWK is determined. At 835, the BCKEK is used to decrypt the CWK. In some embodiments, the decryption of the CWK using the BCKEK is implemented similar to the manner in 730 of process 700 of FIG. 7.

In response to a determination that a customer associated BYOK is not used as a top-level key at 825, process 800 proceeds to 840 at which the CKEK used to encrypt the CWK is determined. At 845, the CKEK is used to decrypt the CWK. In some embodiments, the decryption of the CWK using the CKEK is implemented similar to the manner in 730 of process 700 of FIG. 7.

At 850, the data stored within the tenant database is obtained. In some embodiments, the obtaining the data is implemented in a manner similar to 735, 740, and 745 (e.g., decrypting the ciphertext for the TKEK using the CWK, decrypting the ciphertext for the TSEK using the TKEK, and decrypting the data using the TSEK).

At 855, the data responsive to the request to access data is provided. In some embodiments, the providing the data associated with the request to access data is implemented similar to the manner in 750 of process 700 of FIG. 7.

At 860, a determination is made as to whether process 800 is complete. In some embodiments, process 800 is determined to be complete in response to a determination that no further data is to be decrypted in connection with the request to access data, no further requests to access data are received (e.g., within a threshold period of time), the user has exited the system, an administrator indicates that process 800 is to be paused or stopped, etc. In response to a determination that process 800 is complete, process 800 ends. In response to a determination that process 800 is not complete, process 800 returns to 805.

Figure 9:
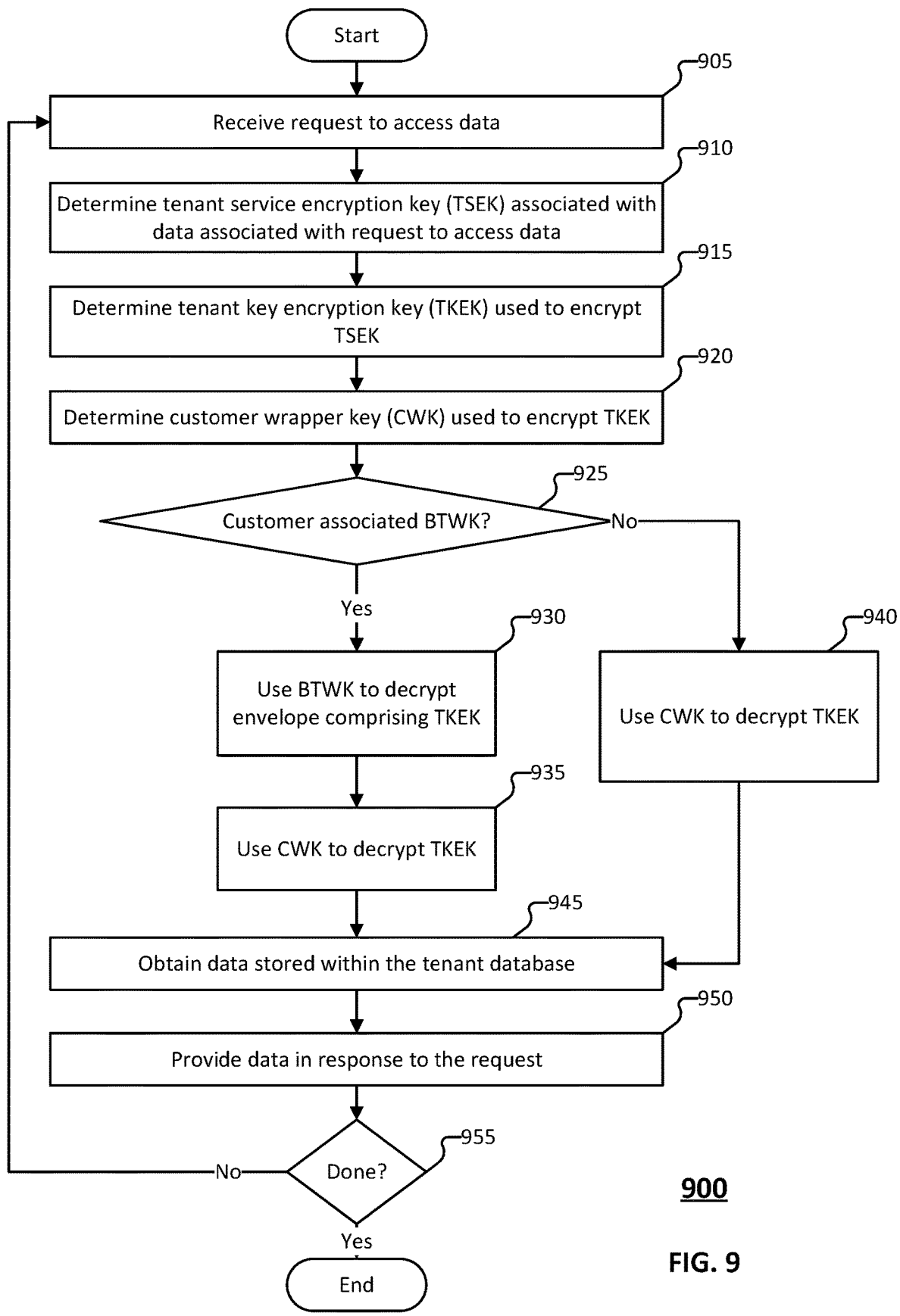
FIG. 9 is a flow diagram of a method for encrypting/decrypting data according to various embodiments of the present application.

FIG. 9 is a flow diagram of a method for encrypting/decrypting data according to various embodiments of the present application. In some embodiments, process 900 is implemented by system 100 of FIG. 1, system 200 of FIG. 2, and/or system 300 of FIG. 3. Process 900 is implemented in connection with decrypting data stored in the tenant database. In some embodiments, process 900 is performed by one or more servers.

At 905, a request to access data is received. In some embodiments, the receiving the request to access data is implemented similar to the manner in 705 of process 700 of FIG. 7.

At 910, a TSEK associated with the data associated with the request to access data is determined. In some embodiments, the determining the TSEK is implemented similar to the manner in 710 of process 700 of FIG. 7.

At 915, a TKEK used to encrypt the TSEK is determined. In some embodiments, the determining the TSEK is implemented similar to the manner in 715 of process 700 of FIG. 7.

At 920, a CWK used to encrypt the TKEK is determined. In some embodiments, the determining the CWK is implemented similar to the manner in 720 of process 700 of FIG. 7.

At 925, a determination is made as to whether a customer associated BTWK is used in connection with encrypting the TKEK. In some embodiments, the system determines whether a BYOK feature for encrypting the TKEK is enabled for the customer. For example, the system determines whether a value/setting of a field indicating a corresponding state for the BYOK feature has been set as enabled or disabled. As another example, the system determines whether the BYOK feature is enabled for the customer based at least in part on the top-level key used to encrypt the CWK key metadata corresponding to the TKEK. For example, the system obtains key metadata corresponding to the TKEK, and determines a UUID for the CWK and a UUID for a BTWK (e.g., in the case that the key metadata corresponding to the TKEK comprises a UUID for the BTWK, the system determines that the customer associated BTWK is used in connection with encrypting the TKEK).

In response to a determination that a customer associated BTWK is used in connection with encrypting the TKEK at 925, process 900 proceeds to 930 at which the BTWK is obtained and used to decrypt the TKEK. In some embodiments, in response to determining the TKEK (e.g., the key used to encrypt the TSEK), the system (e.g., a KMS running on a tenant database layer) determines (e.g., obtains) key metadata corresponding to the TKEK, and the system determines an identifier associated with a key (e.g., the BTWK) used to wrap/encrypt the TKEK. As an example, the system determines an identifier associated with the CWK and an identifier associated with the BTWK based at least in part on the key metadata corresponding to the TKEK. For example, the system obtains key metadata corresponding to the TKEK, and determines a UUID associated with the wrapper (e.g., the UUID of the BTWK used to encrypt the TKEK).

In some embodiments, the system determines one or more third party KMSs at which the BTWK is stored, and the system sends an encrypted version of the TKEK such as ciphertext for the TKEK to the third party KMS, the third party KMS uses the applicable BTWK stored in a corresponding HSM to decrypt the encrypted version of the TKEK to obtain a version of the TKEK that is wrapped with the CWK, and the third party KMS provides version of the TKEK that is wrapped with the CWK to the KMS (or directly to a KMS running on tenant database layer).

At 935, the CWK is used to decrypt the TKEK. In some embodiments, the CWK is used to decrypt the version of the TKEK obtained from the third party KMS (e.g., the version of the TKEK that was obtained based at least in part on decrypting a ciphertext for the TKEK using the BTWK). In some embodiments, the CWK is obtained such as in a manner similar to 725 and 730 of process 700 of FIG. 7 (e.g., the CWK is obtained based on a decryption of an encrypted version of the CWK, and the CWK is in turn used to decrypt an encrypted version of the TKEK).

In response to a determination that a customer associated BTWK is not used in connection with encrypting the TKEK at 925, process 900 proceeds to 940 at which the TKEK is decrypted using the CWK, and control passes to 945. In some embodiments, the CWK is obtained such as in a manner similar to 725 and 730 of process 700 of FIG. 7. In some embodiments, the TKEK is decrypted using the CWK in a manner similar to 735 of process 700 of FIG. 7.

At 945, the data stored within the tenant database is obtained. In some embodiments, the obtaining the data is implemented in a manner similar to 740 and 745 (e.g., decrypting the ciphertext for the TSEK using the TKEK, and decrypting the data using the TSEK).

At 950, the data responsive to the request to access data is provided. In some embodiments, the providing the data associated with the request to access data is implemented similar to the manner in 750 of process 700 of FIG. 7.

At 955, a determination is made as to whether process 900 is complete. In some embodiments, process 900 is determined to be complete in response to a determination that no further data is to be decrypted in connection with the request to access data, no further requests to access data are received (e.g., within a threshold period of time), the user has exited the system, an administrator indicates that process 900 is to be paused or stopped, etc. In response to a determination that process 900 is complete, process 900 ends. In response to a determination that process 900 is not complete, process 900 returns to 905.

Various examples of embodiments described herein are described in connection with flow diagrams. Although the examples may include certain steps performed in a particular order, according to various embodiments, various steps may be performed in various orders and/or various steps may be combined into a single step or in parallel. In some embodiments, some steps may be excluded from the various examples described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a key management service (KMS), wherein the KMS is in communication with a tenant database, wherein the tenant database is associated with a tenant, wherein the tenant is associated with an entity, and wherein data is stored in the tenant database is encrypted based at least in part on a tenant service encryption key (TSEK);
one or more processors configured to:
receive an indication to determine a wrapper key, wherein the wrapper key is used in connection with the TSEK based at least in part on a TSEK metadata stored in the tenant database in association with the TSEK;
determine a tenant key encryption key (TKEK) based at least in part on a mapping of the TKEK to a key used to encrypt the TSEK;
store an encrypted version of the TKEK in the tenant database; determine the wrapper key based at least in part on a TKEK metadata stored in association with the TKEK, wherein the wrapper key is associated with the entity;
encrypt the wrapper key to generate an encrypted version of the wrapper key using a top-level key; and
store the encrypted version of the wrapper key and wrapper key metadata in the KMS;
a memory coupled to the one or more processors and configured to provide the one or more processors with instructions.

2. The system of claim 1, wherein an encrypted version of the TSEK is stored in the tenant database.

3. The system of claim 1, wherein the TSEK is encrypted based at least in part on the TKEK, and an encrypted version of the TKEK is stored in the tenant database.

4. The system of claim 1, wherein an encrypted version of the TKEK metadata is stored in the tenant database.

5. The system of claim 1, wherein the TKEK metadata indicates an identifier corresponding to the wrapper key.

6. The system of claim 1, wherein the one or more processors is further configured to:
determine a Bring-your-own-key Tenant Wrapper Key (BTWK) that is used in connection with encrypting a key envelope comprising the TKEK, wherein:
the key envelope comprising the TKEK is encrypted using the wrapper key;
the BTWK is determined based at least in part on the wrapper key metadata; and
an identifier of the BTWK is stored in the tenant database.

7. The system of claim 6, wherein:
the BTWK corresponds to an entity provided tenant wrapper key that is provided by the entity; and
a ciphertext created based on encrypting the TKEK with the wrapper key is encrypted with the BTWK.

8. The system of claim 1, wherein the top-level key used in connection with encrypting the wrapper key is determined based at least in part on the wrapper key metadata and includes performing a lookup in the tenant database for information stored with respect to the wrapper key to determine the top-level key most recently used in connection with encrypting the wrapper key.

9. The system of claim 8, wherein determining the top-level key comprises:
performing a lookup in the tenant database of a last entry in the tenant database storing mappings of organization wrapper keys to top-level keys; and
determining the top-level key used in connection with encryption for a last entry in the mappings of the organization wrapper keys to the top-level keys, the last entry being a most recent entry for an organization.

10. The system of claim 1, wherein the top-level key corresponds to a top-level entity provided key that is provided by an entity associated with the tenant.

11. The system of claim 1, wherein the KMS that manages the wrapper key is provided access to the top-level key via one or more third party KMSs.

12. The system of claim 1, wherein the top-level key corresponds to a top-level service provided key that is provided by a service provider that provides access to the data stored within the tenant database.

13. The system of claim 1, wherein obtaining data stored within the tenant database comprises:
decrypting the encrypted version of the wrapper key based at least in part on the top-level key to obtain the wrapper key;
decrypting an encrypted version of the TSEK based at least in part on the wrapper key to obtain the TSEK; and
decrypting the data stored within the tenant database using the TSEK to obtain the data.

14. The system of claim 13, wherein the decrypting the encrypted version of the TSEK based at least in part on the wrapper key to obtain the TSEK further comprises:
decrypting an encrypted version of the TKEK based at least in part on the wrapper key to obtain the TKEK; and
decrypting an encrypted version of the TSEK based at least in part on the TKEK to obtain the TSEK.

15. The system of claim 14, wherein the decrypting an encrypted version of TKEK based at least in part on the wrapper key to obtain the TKEK comprises:
decrypting the encrypted version of the TKEK based at least in part on the wrapper key and a Bring-your-own-key Tenant Wrapper Key (BTWK) to obtain the TKEK key, wherein:
the BTWK key is determined based at least in part on wrapper metadata.

16. The system of claim 1, wherein the KMS is configured to connect a plurality of third party KMSs.

17. The system of claim 16, wherein the KMS determines from among the plurality of third party KMSs a tenant third party service associated with the tenant and storing the top-level key used to encrypt the wrapper key.

18. A method, comprising:
receiving an indication to determine a wrapper key, wherein the wrapper key is used in connection with the TSEK based at least in part on a TSEK metadata stored in the tenant database in association with the TSEK;

determining, using a processor, a tenant key encryption key (TKEK) based at least in part on a mapping of the TKEK to a key used to encrypt the TSEK;

storing an encrypted version of the TKEK in the tenant database;

determining the wrapper key based at least in part on a TKEK metadata stored in association with the TKEK, wherein the wrapper key is associated with the entity;

encrypting the wrapper key to generate an encrypted version of the wrapper key using a top-level key; and storing the encrypted version of the wrapper key and wrapper key metadata in a key management service (KMS), wherein the KMS is in communication with a tenant database, wherein the tenant database is associated with a tenant, wherein the tenant is associated with an entity, and wherein data is stored in the tenant database is encrypted based at least in part on a tenant service encryption key (TSEK).

19. A computer program product embodied in a non-transitory computer readable medium and comprising computer instructions for:

receiving an indication to determine a wrapper key, wherein the wrapper key is used in connection with the TSEK based at least in part on a TSEK metadata stored in the tenant database in association with the TSEK;

determining, using a processor, a tenant key encryption key (TKEK) based at least in part on a mapping of the TKEK to a key used to encrypt the TSEK;

storing an encrypted version of the TKEK in the tenant database;

determining the wrapper key based at least in part on a TKEK metadata stored in association with the TKEK, wherein the wrapper key is associated with the entity;

encrypting the wrapper key to generate an encrypted version of the wrapper key using a top-level key; and storing the encrypted version of the wrapper key and wrapper key metadata in a key management service (KMS), wherein the KMS is in communication with a tenant database, wherein the tenant database is associated with a tenant, wherein the tenant is associated with an entity, and wherein data is stored in the tenant database is encrypted based at least in part on a tenant service encryption key (TSEK).

* * * * *